(12) United States Patent
Daoura et al.

(10) Patent No.: US 12,408,006 B1
(45) Date of Patent: Sep. 2, 2025

(54) TRACKING DEVICE SYSTEMS

(71) Applicant: PB Inc., Issaquah, WA (US)

(72) Inventors: Daniel J Daoura, Renton, WA (US); Kal Karel Lambert, Hammond, OR (US)

(73) Assignee: PB Inc., Issaquah, WA (US)

( * ) Notice: Subject to any disclaimer, the term of this patent is extended or adjusted under 35 U.S.C. 154(b) by 0 days.

(21) Appl. No.: 18/123,244

(22) Filed: Mar. 17, 2023

(51) Int. Cl.
*G08B 25/08* (2006.01)
*G06K 7/10* (2006.01)
*G06K 19/07* (2006.01)
*G08B 25/10* (2006.01)
*H04W 4/029* (2018.01)

(52) U.S. Cl.
CPC ........ *H04W 4/029* (2018.02); *G06K 7/10366* (2013.01); *G06K 19/0723* (2013.01)

(58) Field of Classification Search
CPC ..... A61B 5/0002; A61B 5/002; A61B 5/0022; A61B 5/11; H04L 67/025; H04L 67/125; H04W 84/18; G01D 21/00
See application file for complete search history.

(56) References Cited

U.S. PATENT DOCUMENTS

| | | | | |
|---|---|---|---|---|
| 8,620,343 B1 * | 12/2013 | Lau | .......... | G01S 19/09 340/568.1 |
| 2009/0231198 A1 * | 9/2009 | Walsh | ................ | A63B 24/0021 342/463 |
| 2011/0074587 A1 * | 3/2011 | Hamm | .................. | G06Q 10/08 340/673 |
| 2011/0140884 A1 * | 6/2011 | Santiago | ............... | G01S 5/0027 340/539.13 |
| 2012/0007713 A1 * | 1/2012 | Nasiri | ................... | G06F 3/0233 455/574 |
| 2012/0277892 A1 * | 11/2012 | Vock | ....................... | G01P 15/00 700/91 |
| 2013/0066448 A1 * | 3/2013 | Alonso | .................... | H04Q 9/00 700/91 |
| 2013/0166198 A1 * | 6/2013 | Funk | .................. | G01C 21/1654 701/446 |
| 2013/0179110 A1 * | 7/2013 | Lee | ...................... | A61B 5/1123 702/141 |
| 2022/0086227 A1 * | 3/2022 | Skaaksrud | ............... | H04Q 9/02 |

\* cited by examiner

*Primary Examiner* — Mirza F Alam
(74) *Attorney, Agent, or Firm* — Christensen O'Connor Johnson Kindness PLLC

(57) ABSTRACT

In a tracking device system, a networked smart device is enabled to cause execution of an executable function if a trigger condition of a conditional rule is satisfied. The conditional rules are customizable on a user interface of the smart device. The trigger condition may be any sensor information from a tracking device, or a location, a time, a date, a button press, a proximity, and more generally a trigger condition can be any condition that has a truth value by which an IF/THEN conditional rule can be evaluated and either is satisfied or not. Executable functions for use as conditional rules may be selected from functions of the smart device, but also may include functions of a remote apparatus or functions such as an alarm state activation of a tracking device display. Tracking devices typically include a Bluetooth® radio and may also have a cellular radio. The tracking device systems includes adio units in the substrate body of snow sports equipment items and provide system lost-and-found services over most of the globe and engaging Billions of users, for example.

9 Claims, 28 Drawing Sheets

EXPLODED VIEW

TRACKING DEVICE SYSTEMS

CROSS REFERENCE TO RELATED APPLICATIONS

This new application is related to U.S. patent application Ser. No. 17/228,403 filed 12 Apr. 2021, titled Tracking Device Systems, which is a Continuation-in-Part of U.S. patent application Ser. No. 16/747,458 filed 20 Jan. 2020, titled Tracking Device System, now U.S. Pat. No. 10,979,862, which is a Continuation-in-Part of U.S. patent application Ser. No. 14/301,236 filed 10 Jun. 2014, titled Tracking Device System, now U.S. Pat. No. 10,580,281; and is also related to U.S. patent application Ser. No. 16/207,192 filed 2018 Dec. 3, titled Tracking Device Program, System And Methods, now U.S. Pat. No. 11,145,183, which is a Continuation-in-Part of U.S. patent application Ser. No. 15/853,917 filed 25 Dec. 2017, titled Tracking Device Program, now U.S. Pat. No. 10,424,189, which is a Continuation of U.S. patent application Ser. No. 14/301,250, filed 10 Jun. 2014, titled Tracking Device Program, now U.S. Pat. No. 9,892,626. All said patents and patent applications are incorporated in full herein by reference for all that they teach.

This patent application is further related to U.S. Pat. Nos. 9,392,404; 9,564,774; 10,546,228, 9,961,523; 10,638,401; 9,774,410; 9,900,119; 10,063,331; 10,361,800; 10,937,286; 11,184,858, and to U.S. patent application Ser. No. 16/950,666, titled HYBRID CELLULAR BLUETOOTH TRACKING DEVICES, METHODS AND SYSTEMS, filed 17 Nov. 2020; and to U.S. patent application Ser. No. 17/163,403, titled XCB TRACKING DEVICES, METHODS AND SYSTEMS, filed 30 Jan. 2021. All said related applications are incorporated in full herein by reference for all that they teach.

BACKGROUND

This invention is in the field of wireless electronic radiotags and networks.

There are wireless devices and systems for tracking objects, assets, pets and individuals. For example, radio frequency identification (RFID) tags have long been used to track objects, pets, cattle, and hospital patients. A reader generates an electromagnetic field in the tag and that field powers a small transmitter in the tag that emits a signal with the identity of the tag. The reader picks up the tag's radio waves and interprets the frequencies as meaningful data. RFID tags require close proximity between the reader and the tag and such systems are often limited to generating only identity information and do not provide information about the motion, heading, time, temperature or other environmental characteristics in the vicinity of the tag.

There are systems with sensors attached to clothing or objects for monitoring the physical activity of those wearing the clothing of the motion of the object. See, for example, Pub. No. US 2013/0274587. It has sensor and transmitter to send information about the motion of the object and the temperature sensed by the object. A base station uses GPS or triangulation to identify the location of the object. Although the monitoring system may have one or more alerts, no alerts are provided on the sensors on the clothing of the users.

Other tracking systems use tracking sensors with built-in GPS systems and transceivers for establishing wireless communication with a network. One such system is found in U.S. Pat. No. 8,665,784. However, the power required to operate a GPS system often rapidly drains the battery of such tracking sensors or requires the sensors to have a relatively large package, which is not readily attached to small objects, pets or people.

The prior art solutions do not address the problem of finding small, lost objects in within a room or house as well as at a distance. Known solutions are not compatible or cost effective for individuals. Large sensors that require recharging many batteries impose too high a level of maintenance on an individual. None of the above solutions will find a small sensor that may be hidden in drawer or under a pillow. They do not provide control apparatus for commanding the sensor to emit an audible or visual alert. The prior art shown above is silent regarding the problems of pairing sensors with location, remote controlling a sensor, and using a sensor to remote control a sensor control device over a network, for example.

SUMMARY

This summary is provided to introduce a selection of concepts that are then further described in the Detailed Description. This summary is not intended to be used as an aid in determining the scope of the claimable subject matter.

Embodiments of the "tracking devices" or "radiotags" of the invention are configurable by an individual user to help track or find lost objects and monitor pets and to monitor the activities of small children or hospital patients as part of a lost-and-found radio system. The terms "tracking device" and "radiotag" may be used interchangeably to indicate a radio locator device that is attachable to an asset, person or pet in need of location and tracking services. The system is a comprehensive solution to locate, monitor and track missing pets, people, luggage, inventory, tools and items of interest. In some embodiments, tracking devices incorporate various sensors and control mechanisms that make the tracking devices a versatile multi-function device which can remotely control other devices such as smartphones, tablets, or computers. The device is instrumental in shaping and creating a market for the "internet of things" by allowing a user or network of users to seamlessly share sensor data while providing a regional or global picture of environmental conditions such as temperature, movement, trends in a particular area or simply a collaborative picture of all dogs active in a particular city at a specific time. The tracking device has a speaker and a light emitting diode. A control apparatus is associated with the tracking device. The control apparatus may command the tracking device to emit an alert, including a buzz or flashing light. If a tracked object is inside a drawer or under a pillow, the person searching for the object will hear the buzz or see the flashing light. The control apparatus may also set its own alerts to trigger based upon the distance between the tracking device and the control apparatus. Alerts can be based upon pairing the location of the tracking device to the alert so that alerts are only provided at predetermined locales and/or predetermined times.

Embodiments of the tracking devices conserve power and space. The electronics of the tracking device may be carried on a crescent-shaped printed circuit board that partially encircles a battery. Encircling the battery with the printed circuit board reduces the thickness of the tracking device. Top and bottom covers enclose the printed circuit board and the battery. One cover has an opening to access the battery. In some embodiments the battery may be wirelessly recharged with inductive or solar powered chargers.

The electronics include a Bluetooth® low energy transmitter that has enough computing power to control sensors and the tracking device. A ceramic antenna further conserves space. In some embodiments the sensors include a multi-axis sensor such as a nine-axis motion sensor, a heading sensor with magnetic compass and multiaxis gyroscope, or a temperature sensor. Embodiments may omit GPS sensing circuitry and rely on the GPS circuitry in control devices. Other embodiments include GPS circuitry. Using one or more programs in a control apparatus, a tracking device can be set to trigger one or more alerts depending upon the distance between the tracking device and the control apparatus.

There are multiple network embodiments for the tracking devices. In a local network a hub communicates with local tracking devices and relays their sensor outputs to a cloud/internet site. Multiple hubs can form a wider area network that allows the hubs to communicate with each other and triangulate the approximate position of each tracking device. In a still wider area network, tracking devices anywhere in the world can be monitored by position, time of day, motion and any other characteristic or parameter sensed by a tracking device.

The tracking devices are assigned to an owner-user who may grant privileges to others for using the devices of the owner. The owner-user may also have shared privileges with tracking devices of other users. Objects lost anywhere in the world may be located by using position data provided by other control devices that carry the control program and are registered to the cloud/internet site.

The embodiments described herein provide a computer program that is installed on a control apparatus. The computer program enables the control apparatus to detect tracking devices within range of the control apparatus and acquire control of the tracking device unless another control apparatus already controls the device. The control apparatus may also release from its control one or more selected tracking devices. The control program also allows the user to keep private the information of the tracking device. Once set to private, only the control apparatus or other designated apparatuses or individuals will have access to data from the tracking device.

The control program allows the user of the user to select at least one alert. The control device or the tracking device or both may generate the alerts. In order to trigger the alert, the tracking device broadcasts a beacon signal via a Bluetooth transceiver. The signal strength of the beacon signal received by the control apparatus is representative of the distance or range between the control apparatus and the tacking apparatus. The signal strength is considered a condition for a distance alert. If a control apparatus suddenly receives a beacon signal of a controlled tracking device, the control apparatus may indicate the device has returned to a location proximate the control apparatus. Likewise, failure to detect a beacon signal of a controlled tracking device indicates the device is outside the range of the control apparatus. The relative strength of the beacon signal is proportional to the proximity between the control apparatus and the controlled tracking device.

The control apparatus or the tracking device or both may monitor other conditions. Each other condition and combinations of two or more conditions may be paired or otherwise associated with each other to provide multiple conditions for triggering an alert. In addition to the range signal beacon, the tracking device may carry one or more sensors and each sensor may output one or more signals representative of other conditions monitored by the sensors. Other conditions include and are not limited to motion of the sensor in any direction or in a particular direction; temperature and other signals representative of time, the geographic location of the tracking device or both, motion and other physical, biological or chemical conditions being monitored by sensors. As such, each condition monitored may be associated or paired with any other one or more conditions to provide multiple conditions that must be met to trigger an alert.

The beacon signal includes the identification information for the tracking device and a signal representative of the status of the charge of the battery, and is broadcast as a bitstream containing bits in fields or frames having a defined format. The program displays both the range and battery status information. As explained above, the location of the tracking device may be detected by other control devices, which may assist the owner in locating a lost tracking device. Accordingly, the control apparatus, if associated with network of other control apparatuses, may acquire information about the location of a tracking device remote from the other networked control apparatus. The control program provides a feature for selecting a map displaying the remote location of each tracking device controlled by the control apparatus.

In other embodiments the control program allows the control system to remotely control operation of the tracking device or allow the tracking device to remotely control the control apparatus or both. The control program enables the control apparatus to activate an audible or visual alarm or both by selecting a corresponding alarm button shown on a display of the control program. The control program allows the control apparatus to allow one of more of its operations to be controlled by the tracking device. The control program permits the user to set the multi-function button on the tracking device to operate a camera, an email or a text messaging system of the control apparatus. In addition, the multi-function button may be programmed with the control program to activate an audible alarm on the control apparatus. For example, pressing the multi-function button may cause a smartphone control apparatus to emit a distinctive sound.

In yet other instances, the control program may be configured to allow the user to define groups of objects (each having a tracking device) and to find or track those objects as a group. In selected instances, the control program may be configured to track objects leaving a geofenced area with other users. And in some instances the message traffic may be repurposed for orientation purposes.

The embodiments described herein provide a computer program that is installed on a cloud host. The cloud host is a server or servers having an IP address and is accessible via a packet data environment. The cloud host includes programs and databases designed to implement lost-and-found location and tracking services.

As expanded here, the embodiments include both a Bluetooth radio modem implementation, with or without GPS, and a Cellular radio modem implementation, with or without GPS, in a radio tracking device ("radiotag" or "radiobeacon") that is positionable within a substrate material of an asset or device, here specifically identifying structural features relevant to snow sports equipment including skis, snowboards, and splitboards, where flexural properties of the substrate must be considered in implementing a working combination of the substrate with a radio tracking device sub-assembly or unit. Also of relevance is the field life on battery power. Surprisingly, we have realized an IoT system that is operable for an entire ski season on a single battery charge, and is configured to draw on a network, an Internet of Things (IoT) network, that has Billions of users and covers a major part of the globe.

BRIEF DESCRIPTION OF THE DRAWINGS

The teachings of the inventive art disclosed here are more readily understood by considering the drawings in conjunction with the written description including the claims, in which:

DETAILED DESCRIPTION

While exemplary embodiments have been illustrated and described, it will be appreciated that various changes can be made therein without departing from the spirit and scope of the invention. In this disclosure, the term "tracking device" refers to any one of the illustrated examples of radio devices configured for tracking assets or items and reporting location to an owner or a cloud host. The term "tracking device" is generally synonymous with "radiotag" or "radiobeacon" as understood in the art.

Figure 1A:
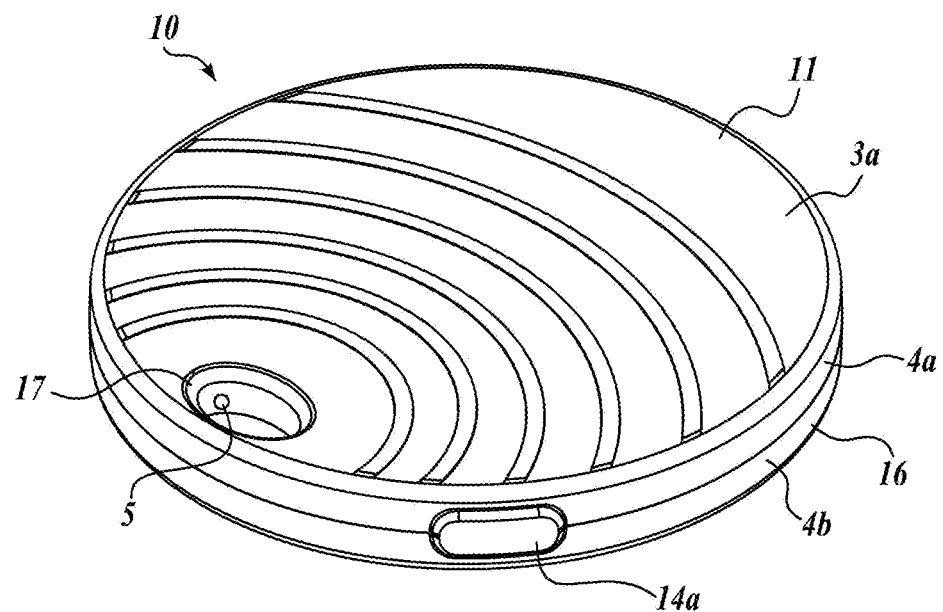
FIG. 1A is a perspective view of the top of a first tracking device.
Figure 1B:
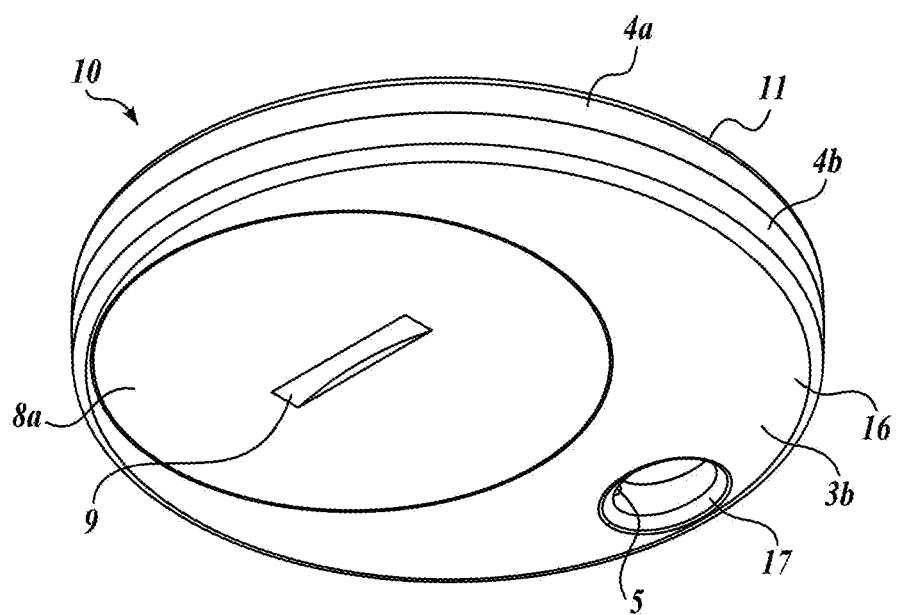
FIG. 1B is a reverse perspective view of the tracking device shown in FIG. 1A.

One embodiment of a tracking device 10 is shown in FIGS. 1A, 1B. The tracking device 10 is an assembly having outside covers 11, 16. The covers are made of glass filled acrylonitrile butadiene styrene (ABS) thermoplastic which is light in weight, can be injection molded and is resistant to impact, heat, water, acids, alkalis, alcohols and oils. The covers 11, 16 have circular-shaped bodies 3a, 3b, each with an annular wall 4a, 4b. The covers also form a through-hole 17 for receiving a cord or chain to attach the tracking device to an object, a pet or the clothing of a person.

Figure 1C:
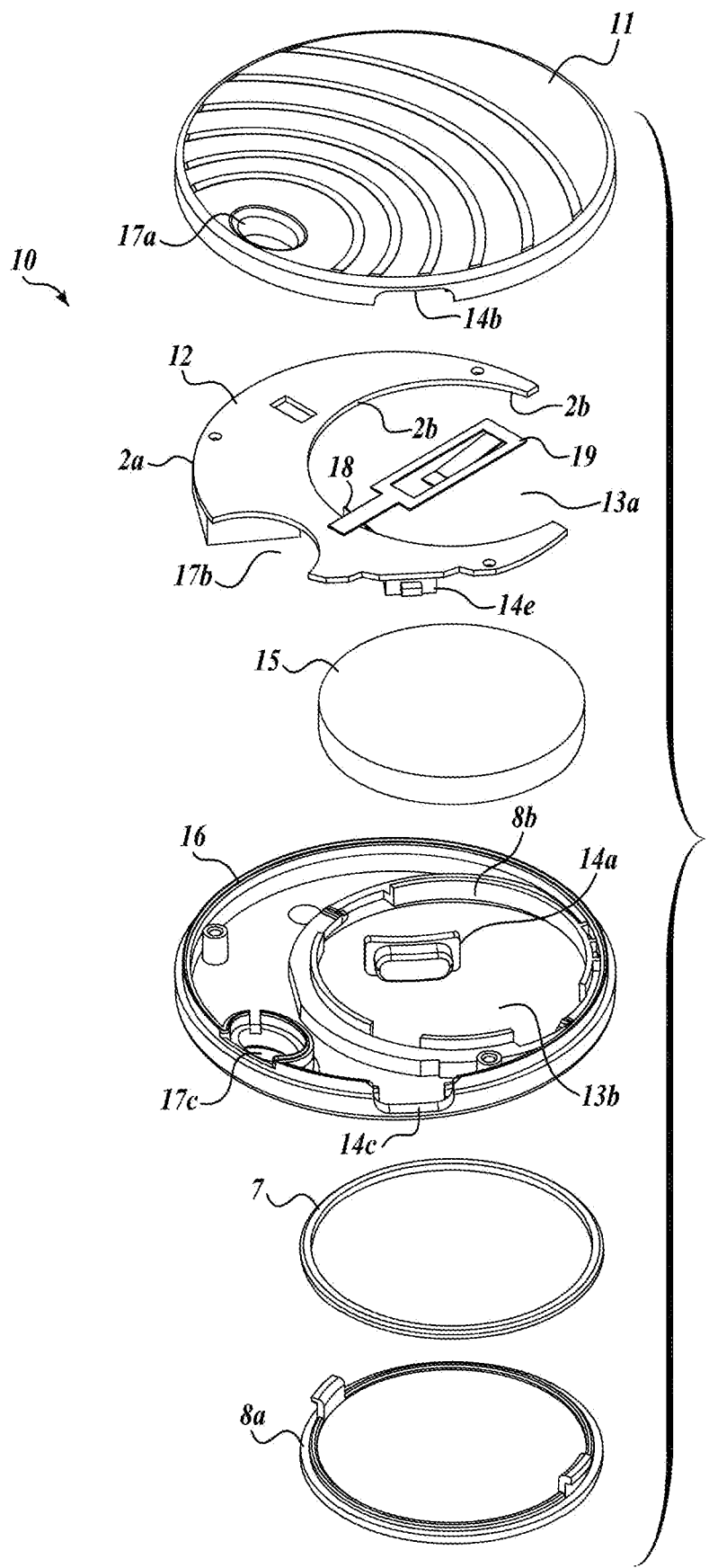
FIG. 1C is an exploded top-to-bottom perspective view of an assembly for a tracking device showing a covers on opposite sides of a printed circuit board (PCB), battery next to an opening in the PCB and a battery connector on one of the covers.
Figure 1D:
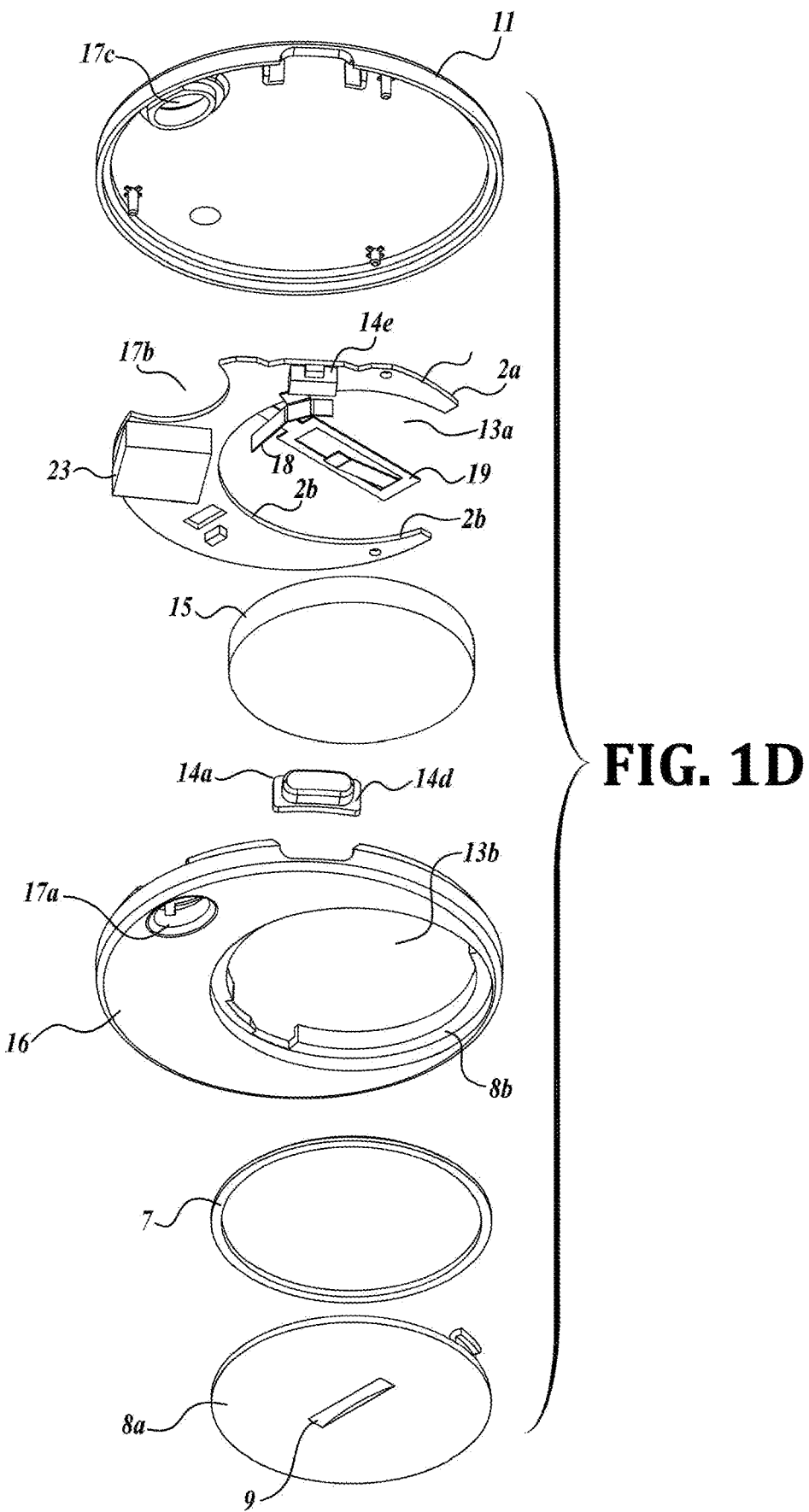
FIG. 1D is a reverse exploded perspective view of the tracking device shown in FIG. 1C.

Turning to FIGS. 1C, 1D, the covers 11, 16 enclose a printed circuit board (PCB) 12 and a battery 15. The PCB 12 has a crescent-shaped body with an outer edge 2a having a radius of curvature slightly smaller than the radius of curvature of the covers 11, 16 and an inner edge 2b with a smaller radius of curvature. Two circular arcs of different diameters thus define the crescent shape of the PCB 12. The PCB 12 has an opening 13a for receiving a circular battery 15.

The diameter of the battery 15 is smaller than the diameter of opening 13a in the PCB 12. The battery 15 has one terminal on its surface and another terminal on its edge.

The edge of the battery engages a conductive edge connector 18 on the inner edge 2b of the PCB 12. Another conductor has a spring-biased body 19 that extends from the PCB 12 toward the middle of a surface of the battery 15. The battery 15 is held in the opening 13a, 13b between the two covers 11, 16 and against the conductive edge connector 18 on the inner edge 2b of the PCB 12. Cover 11 has a ripple wave design on its surface.

Figure 1E:
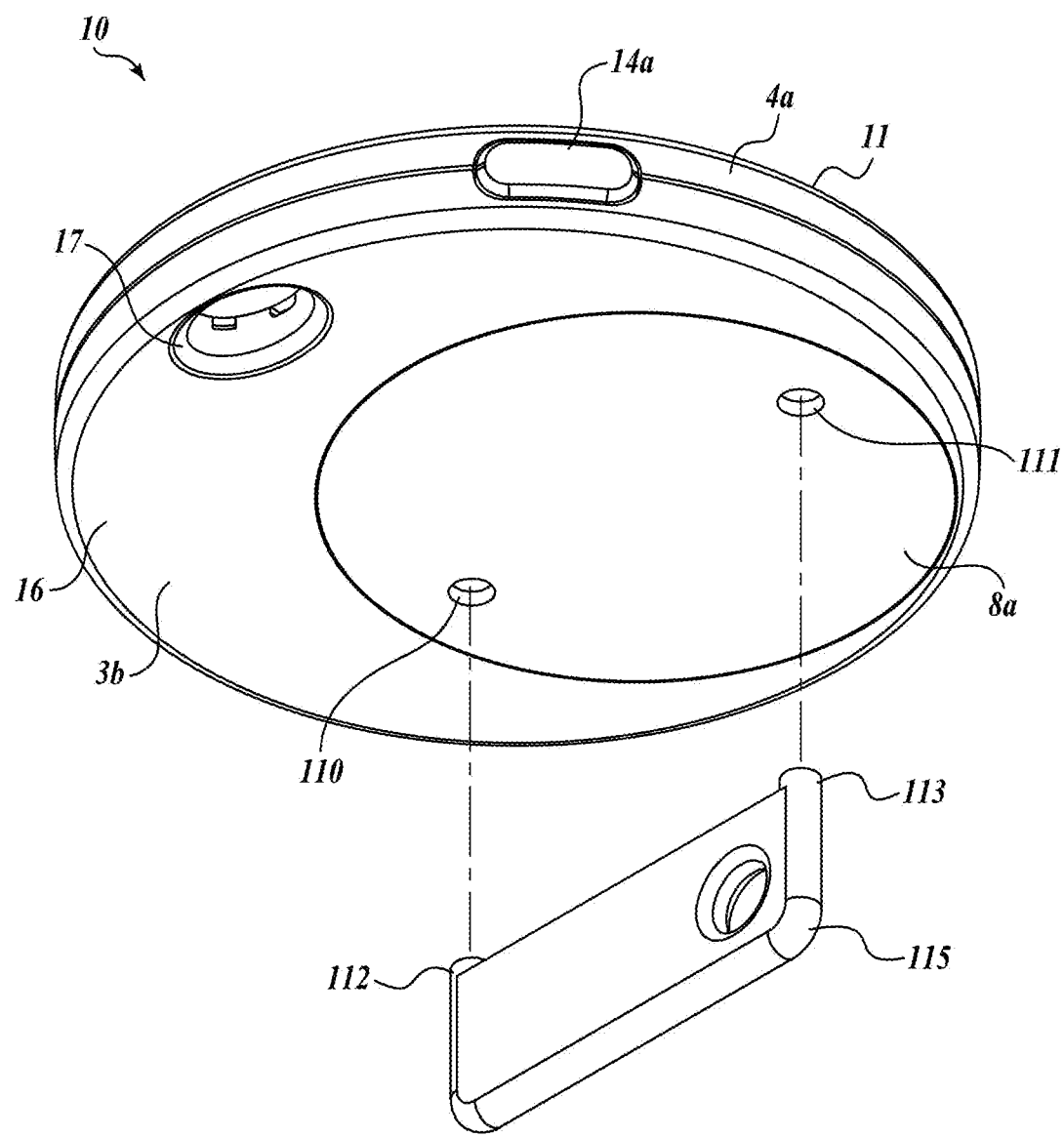
FIG. 1E is a view of an alternate battery cover.

Cover 16 has an opening 13b sufficient to receive the battery 15. A threaded battery cover 8a, a matching threaded annular wall 8b and an O-ring 7 secures battery 15 in the openings 13a, 13b. A detent 9 in the surface of the battery cover 8a receives an opening tool, such a screwdriver or the edge of a coin (not shown). Inserting the tool in the detent and rotating the cover 8a open the cover to access the battery. In an alternate embodiment as shown in FIG. 1E, the slot 9 is replaced by two spaced-apart holes 110, 111. A key 115 has two prongs 112, 113 that fit into the spaced-apart holes and allow a user to apply torque to the cover 8a to open it and remove the battery 15.

The tracking device is assembled by inserting a PCB 12 with component circuitry on the inside surface of cover 16. The other cover 11 is placed on top of cover 16 to define a cavity that holds the battery 15 and the PCB 12. The two covers are ultrasonically sealed to resist water or other materials from entering the device 10. A battery is inserted through opening 13b in cover 16 and the battery cover 8a engages the O-ring 7 and the threaded wall 8b. Cover 8a rotates in opposite directions to close or open. By encircling the battery with the PCB 12, the PCB does not increase the thickness of the assembly that is determined only by the covers 11, 16 and the thickness of the battery 16. Some embodiments are 5 mm thin and 40 mm in diameter. Unlike other devices that use batteries, the PCB does not contribute to the thickness of the device 10 because the battery 15 does not rest on the PCB 12 but is partially encircled by the opening 13c in the PCB 12.

A multi-function button 14a extends from an opening defined by half-oval walls 14b, 14c in the sidewall of the junction of the annular walls 4a, and 4b. In one embodiment there is a single multi-function rubber button 14a that extends from the edge of the device. Button 14a is held in place by wall edges 14b, 14c that overlap surface 14d to hold the rubber button 14a inside the covers 11,16. The rubber button is aligned with a mechanical button 14e that is attached to the PCB 12 and coupled to core device 21. The covers 11, 16 and the PCB 12 have aligned openings 17a, 17b, 17c that create an external key ring hole 17 for holding a key ring, a carrying chain or cord. As will be explained below, the component circuitry has a speaker for sounding one or more alarms. The edge of the covers defines a key ring hole 17 that has on or more small holes that may be sealed. In those embodiments a removable rubber plug 5 is inserted into the hole to prevent moisture and water from entering the cavity holding the component circuitry 20. As an alternative, a larger rubber plug could fill the entire keyhole opening 17 or at least cover the annular inner surface of the keyhole.

Figure 2A:
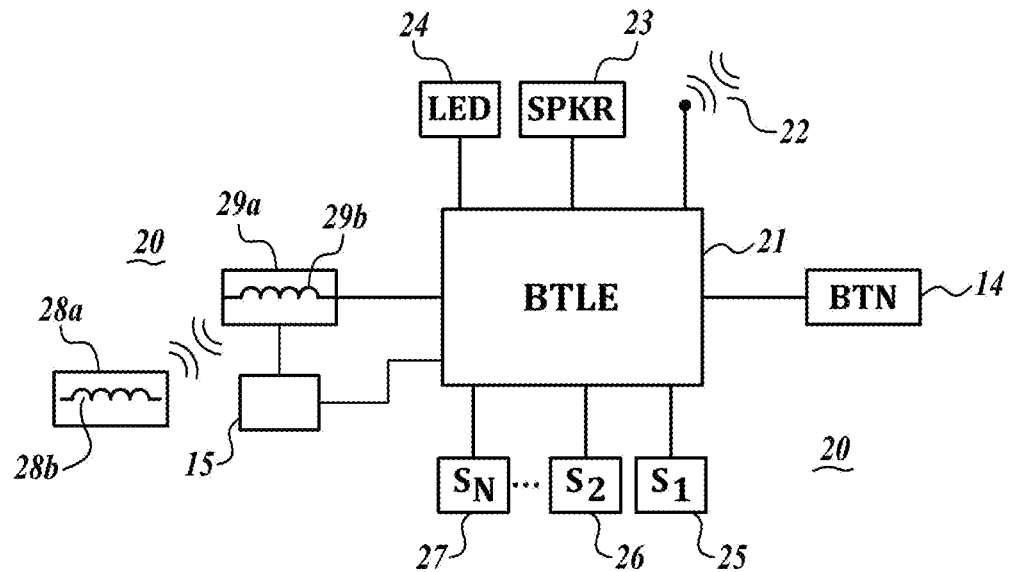
FIG. 2A is block diagram of elements on the PCB.

FIG. 2A shows the component circuitry 20 of the PCB 12, including a Bluetooth low energy (BTLE) core device 21. The core device 21 includes a transceiver for sending and receiving information signals and control signals. The core device also includes a microprocessor, read only memory and random access memory sufficient to enable the core device 21 control the other components on the PCB 12. In a further embodiment, a permanent or removable memory device is added to the device. The memory may be added through another side hole similar to the side hole formed by walls 14b, 14c that hold the rubber button 14d in place. The memory device could be inserted or removed through the second sidewall hole and a rubber stopper, similar to rubber button 14a, would seal the opening second sidewall hole. The memory device may hold information sensed by the sensors.

The core device 21 is assigned a unique identification code known to the user and the core device broadcasts the code at periodic intervals. The maximum range of the core device 21 is approximately 300 feet. Broadcasts are made using a ceramic antenna 22. The ceramic antenna saves space. A typical ceramic antenna may take up only 20% of the space occupied by a trace antenna, thereby contributing to the overall small size of tracking device 10.

The core device 21 controls a speaker 23 and a light emitting diode (LED) 24. The speaker 23 and the LED 24 provide alarms for the tracking device 10. The cover 11 is thin enough to allow light to pass through. In alternate embodiments, a clear or highly translucent window is provided in the cover 11 above the LED 24.

The core device 21 is connected to one or more sensors 25, 26 or any number of sensors 27. The sensors in some embodiments sense physical parameters experienced by the tracking device 20, including and not limited to displacement, motion, acceleration, electromagnetic radiation, radioactivity, temperature, sound, pressure and other physical parameters. In some embodiments, a sensor 25 is a combined 9-axis motion sensor and temperature sensor. The sensor 25 has an accelerometer, gyroscope, and magnetometer for each axis. The information output by the 9-axis sensor enables the receiver to track the position of the tracking device from one location to another location. The motion of the tracking device can be monitored continuously as long as a receiver is close enough to record the motion output information of the 9-axis sensor 25. As an alternative, the information may be stored in the memory.

A multi-function button 14a is operable to perform one of more functions described in more detail below. The single button 14a on the tracking device 10 and one or more control programs resident on a control apparatus 37 (see FIG. 3) operate together to set one or more alarms, pair triggers and remotely control operations of the control apparatus 37. Those skilled in the art understand that a control apparatus may be any electronic device with processor, memory and communication ability including and not limited to a smartphone, a smartwatch, a desktop computer, a laptop or notebook computer, a tablet computer, a personal digital assistant, or any equivalent device that can store and hold programs and data, execute programs, receive and/or transmit information and commands via wired or wireless channels of communication.

Some embodiments of the invention are equipped with rechargeable batteries that may be recharged via a wireless or wired recharging apparatus or a solar recharging apparatus. Wireless chargers, also known as induction chargers, typically place one coil in a charging device or pad that is connected to an AC power source and another (receiver) coil inside the device with a rechargeable battery. As shown in FIG. 2A, a transmitter module 28a has a transmitter coil 28b that produces a time-varying electromagnetic field that is coupled to a receiver coil 29b of a receiver module 29a on the PCB 12. The receiver module 29a also includes circuitry to convert AC voltage and current to DC voltage and current. The core device 21 controls operations of the receiver module 29a and turns it on and off to recharge the battery 15 as needed. Transmitter and receiver modules are available from a number of integrated device manufacturers.

Other embodiments of the invention may have wired rechargers. These are well known devices and may be incorporated into tracking devices 10 by providing a suitable port (not shown) to receive power from an external power source. However, such external ports provide openings in the covers 11, 16 where water or other fluids may gain entry to the cavity holding the PCB 12 and its component circuitry 20.

Figure 2B:
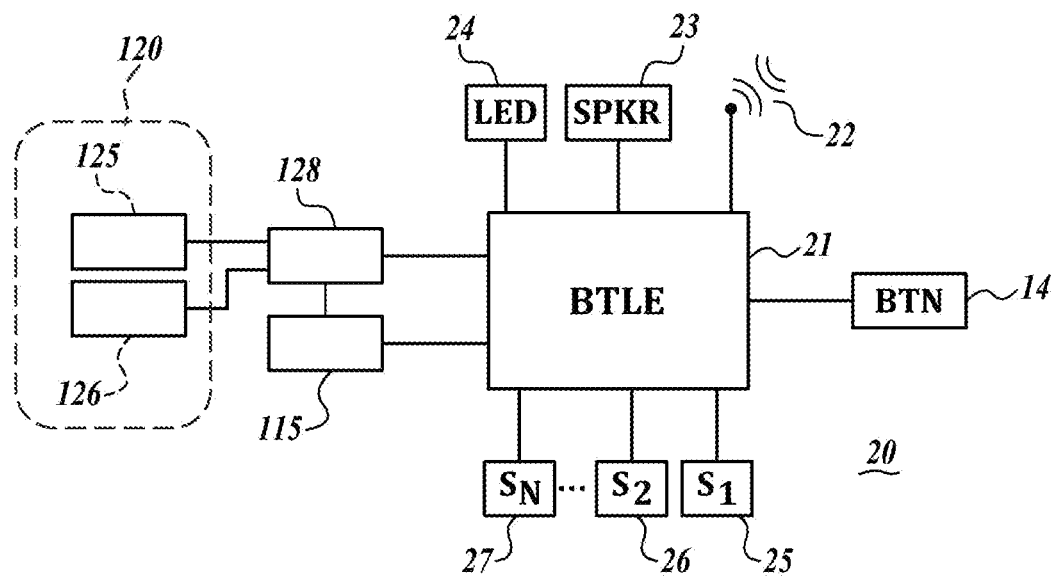
FIG. 2B is a partial schematic of an alternative charging system.

Still other embodiments may have solar recharging systems such as shown in FIG. 2B. One such solar recharging system 120 has one or more solar cells 125, 126 located on respective covers 11, 16 and connected to a battery regulator circuit 128 and rechargeable battery 115. Core device 21 is connected to the regulator circuit 128 and battery 115. The core device 21 uses the solar current to know whether the tracking device is in available light or not. In that way, the solar cells provide a dual role by acting as light sensors. This allows further flexibility by pairing any other sensed parameter to the presence or absence of light. The amount of current generated by the solar cells 125, 126 indicates the intensity of light received by the tracking device 10.

Other embodiments of the tracking device have circuitry for harvesting RF power to charge the battery 115. At http://www.hindawi.com/journals/apec/2010/591640/there is described an RF harvester having a GMS antenna, one or more resonant circuits, boosters, peak detectors and an adder. The circuitry contains passive components and is designed to have tuned circuits at known frequencies of cell phone towers (960 MHz) and Bluetooth devices (2.4 GHZ). The boosters are Villard voltage multipliers. Reported test results show the RF harvester located within 500 meters of a cell tower was capable of generating 158 nW and successfully operated a calculator and a light emitting diode.

Figure 3:
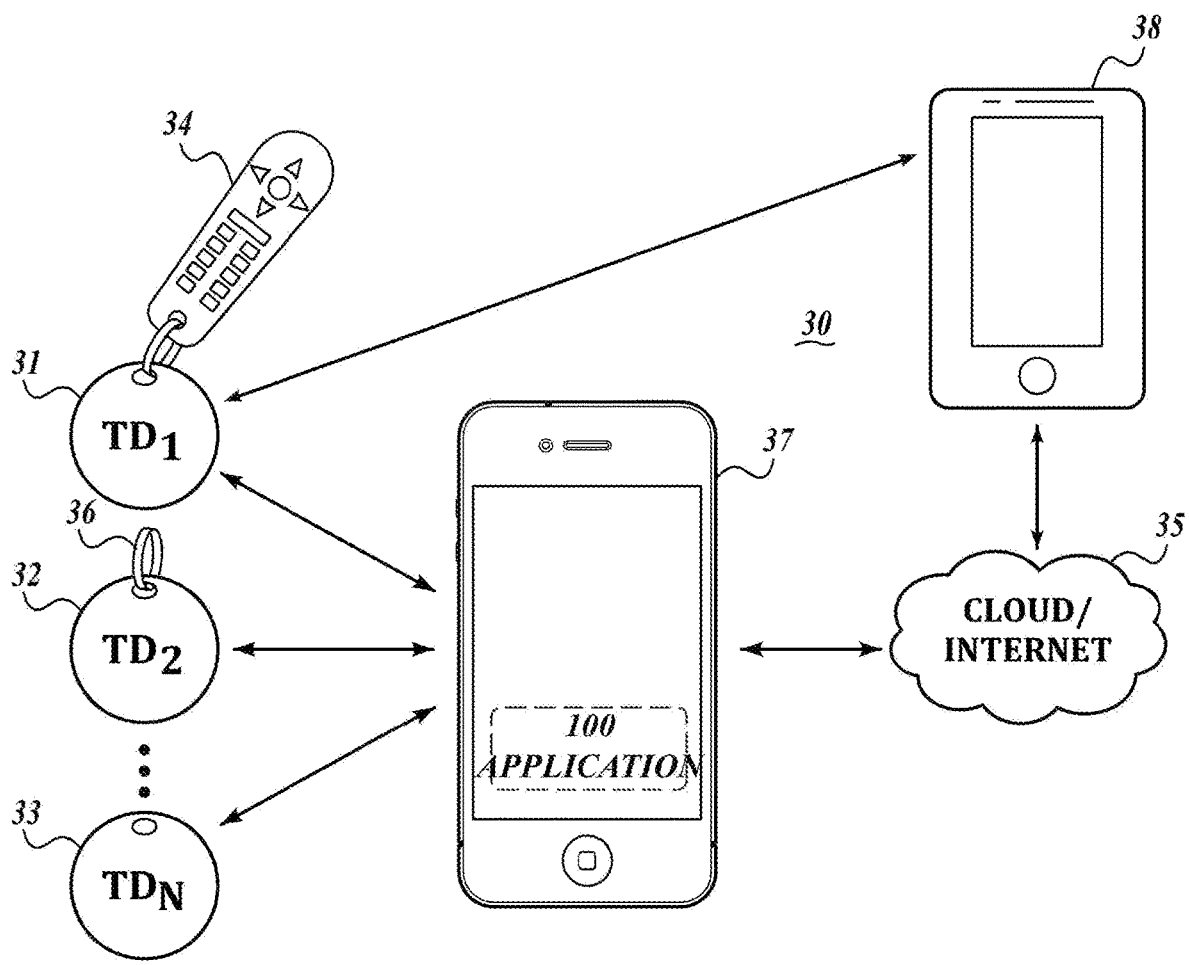
FIG. 3 is a view of a basic tracking system.

Turning to FIG. 3, an embodiment of a first system 30 is shown. The system includes tracking devices $TD_1$ 31, $TD_2$ 32, .... $TD_N$ 33. Each tracking device 10 is paired with a control apparatus 37 which may be a computer, a tablet, a smartphone or a smartwatch, for example. The control apparatus 37 has a transceiver for establishing a wireless connection to the cloud/internet 35. In this patent a symbolic cloud and the reference number 35 are metaphors for the internet itself, for local area networks, for wide area networks and for individual sites on the internet where users may store and retrieve programs and data. Control apparatus 37 may create one or more alerts based upon the relative location between the control apparatus 37 and tracking devices 31-33 and information detected by the sensors 27 in the devices. The system 30 may be used to find a lost object attached to a tracking device 10, set an alert for when an object, pet or person bearing a tracking device 10 moves into or out of one or more predetermined ranges, and pair alerts with locations or motions of the tracking device 10. The owner-user may share with others information transmitted by the tracking devices 31-33 and control of devices 31-33.

Accordingly, another user with a control apparatus 38 may use the same tracking devices 31-33 to establish alerts on the control apparatus 38 that are different from those of the alerts created by control apparatus 37.

Remote controls for television sets are frequently lost. The system 30 solves the problem of finding a lost remote control or other object 34. A tracking device 31 is attached to a remote control or object 34. Any suitable means for attaching is acceptable including hook-and-loop fasteners or adhesives that attach to the object 34 and the tracking device 31. Other attachment means include a chain or cord for attaching the object 34 via a key ring hole. The control apparatus 37 has a program 100 that provides a control menu associated with the tracking device 31. The tracking device 31 has a speaker 23 and an LED 24 that operate upon commands received from the control apparatus 37. The control apparatus 37 sends a suitable signal to the core device 21 to cause the speaker 23 to generate a distinctive sound, such as a buzz or ring, and to operate the LED 24 in a flashing mode, or both, in order to locate the object 34.

The system 30 may also monitor when an object, pet or person enters or leaves a predetermined range with respect to the control apparatus 37. For example, another tracking device 32 has a cord or chain 36 connecting via a key ring hole to and object, a collar of a pet, to an article of a person's clothing, surrounding a wrist of a small child or an Alzheimer patient. The control apparatus 37 sets one or more alerts depending upon the distance between the control apparatus 37 and the tracking device 32. If a parent were shopping with a small child, the parent may program the control apparatus 37 to issue one or more alerts depending upon the distance between the child wearing tracking device 32 and parent carrying the control apparatus 37. If the child and parent became separated by a first predetermined distance, such as 10-15 feet, the control apparatus would emit a first alert, such as one of the many sounds or vibration patterns that are included on a smartphone. If the separation becomes larger, such as 30-50 feet, a second alert would occur with a different sound and/or vibration. A third alert could be provided when the tracking device 32 lost radio contact with the control apparatus 37.

The system 30 may remind a user to take along key personal items before leaving a predetermined location. Tracking devices 33 could be attached to a key ring, a laptop or tablet computer, a brief case, a purse, a wallet, luggage, a backpack or other personal items. A user may carry the tracked items during travel from one place to another. If the user departs a location and forgets the tracked item, an alert would sound on the control apparatus 37 to advise the user he or she forgot the tracked item. Such alerts may be paired to specific locations to that they are only triggered when and where the user wants.

The core device 21 of each tracking device 31 has a clock. The beacon signal and any signal from a sensor may include the time the signal is sent. The clock also may be used to extend the life of the battery 15. The control apparatus 37 may set the tracking device to a power savings mode where its broadcast signal is only active for a short period of time compared to the intervals between activation. The core device also tracks time and any alert may be paired to one or more chosen times or day, week, month or year.

The system 30 may also alert user when an item has returned. For example, assume the tracking device 32 is attached to an automobile operated by another member of the user's household. When the driver of that automobile returns home, the tracking device will trigger an alert in the control apparatus 37 to alert the user that the automobile bearing the tracking device 32 has returned within range of the control apparatus 37.

The tracking devices 33 may have their alerts paired to one or more locations. For example, if a user places tracking device 32 on a brief case or backpack, the user has little need to be warned of leaving the vicinity of the briefcase or backpack when the user is at home or at work. Those locations may be excluded from alerts and all other locations could be active. This embodiment would be especially for commuters who take a train or bus. The alarm could sound if the commuter moves more than 10 feet from the tracking device on the briefcase or backpack.

Among the numerous options available to the user is the option to have one or more alerts activated on the control device 37, the tracking device 32 or both. Recall that some embodiments include a 9-axis motion and temperature sensor 25. Sensor readings are transmitted by core device 21 and received and recorded by the control apparatuses 37, 38 and any other control apparatus with permission to control the tracking device 31. So long as the tracking device 31 is within range of at least one control apparatus, the GPS location of the apparatus and the motion of the tracking device 31 can be viewed on line in real time or at a later time by other users, such as 38. In one embodiment a tracking device 31 is fixed to a snowboard and the snowboarder carries a control apparatus 37 that continuously receives the motion data from tracking device 31.

All travel of the snowboard, including vertical travel up ramps and acrobatic flips and turns of the snowboarder will be sensed by the 9-axis sensor and sent to the first control apparatus 37. That apparatus can be set to record the information received from the tracking device 31 or to continuously transmit the information to the cloud/internet 35.

Another feature of each tracking device is the ability of the owner of the device to share device information or control or both with others. For example, a remote user with control apparatus 38 and with shared privileges may access the cloud/internet 35 and use the recorded motion information to drive a display showing an icon moving in accordance with the same motion as the tracking device 31. In some embodiments the shared users are designated as "friends" of one or more tracking devices that are generally under the control of the owner of the tracking device. As will be explained later, an owner may voluntarily transfer control of a tracking device to another authorized user or simply relinquish control of a tracking device to any other authorized user who is or passes within range of the relinquished tracking device. An authorized user is, at a minimum, a user who has a control apparatus with a copy of an operating program for controlling tracking devices. In other embodiments authorized users are registered with a central user site that may be accessed through the Internet.

Embodiments with the 9-axis motion sensor may be used to pair location, time, direction, and position, velocity and acceleration in each of three axes of motion. For example, a user could set an alert to show whether the speed of a tracking device 31 exceeded a threshold of 10 miles per hour in the time between 10 AM to 11 AM on Aug. 4, 2014, when the temperature was between 75-85° F. while traveling north)) (0-90° within the city limits of Seattle, Wash. As such, motion, time, heading and location may all be paired together or in any combination of one or more types of sensed information to set an alert.

The pairing of tracking device 31 with a smartphone having GPS has endless possibilities. Motion data can be configured to user-defined alerts that include activating the speaker and LED 24. For instance, if a user was jogging and his speed dropped below a threshold, the speaker 23 on the tracking device 10 would buzz. In another embodiment the tracking device 10 monitors temperature outdoors, and buzz from speaker 23 could warn the user when the temperature dropped below a level that would harm outdoor plants. In some embodiments the 9-axis sensor enables the system 30 to control functions of the control apparatus 37. A control program 100 installed on the control apparatus 37 records motion of the tracking device 31 and associates the recoded motion with a function of the control apparatus 37. With the control program 100 open, control apparatus 37 records a motion or set of motions of the tracking device 32. The user then associates the recorded motion of set of motions with a function provided on the control apparatus. Such functions include triggering an alert on the control apparatus 37 when the tracking device 32 moves in any direction, taking a picture with the control apparatus 37 in response to a first predetermined motion or first combination of motions of the tracking device 32, placing a phone call from the control apparatus (smartphone) 37 in response to another motion or another combination of motions of the tracking device 32, sending an email or text message from the control apparatus 37 in response to a third motion or third combination of motions of the tracking device 32. For example, the sensor 25 could be attached to a door or a window and any movement of the door or window would set off an audible or visual alarm on the control apparatus 37. A combination of motions such as shaking the tracking device 32 up and down could command the control apparatus 37 to take a picture. Moving the tracking device 32 left and right could command the control device 37 to send a message (email or text) to one or more addressees with a predetermined announcement, such as, a reminder to take medication. A user may map out specific locations, click the button and the tracking device 32 will save the place of interest. For example, a surveyor could walk a specific path, and mark specific points of interest such as corners of a road, or edges of a hill. The geographic properties of each point of interest would be saved and mapped out. Thus, the tracking device 10 has uses in the fields of gardening, home security, child monitoring, health/fitness, sports applications, navigation, commercial and industrial monitoring and safety appliances.

Figure 4:
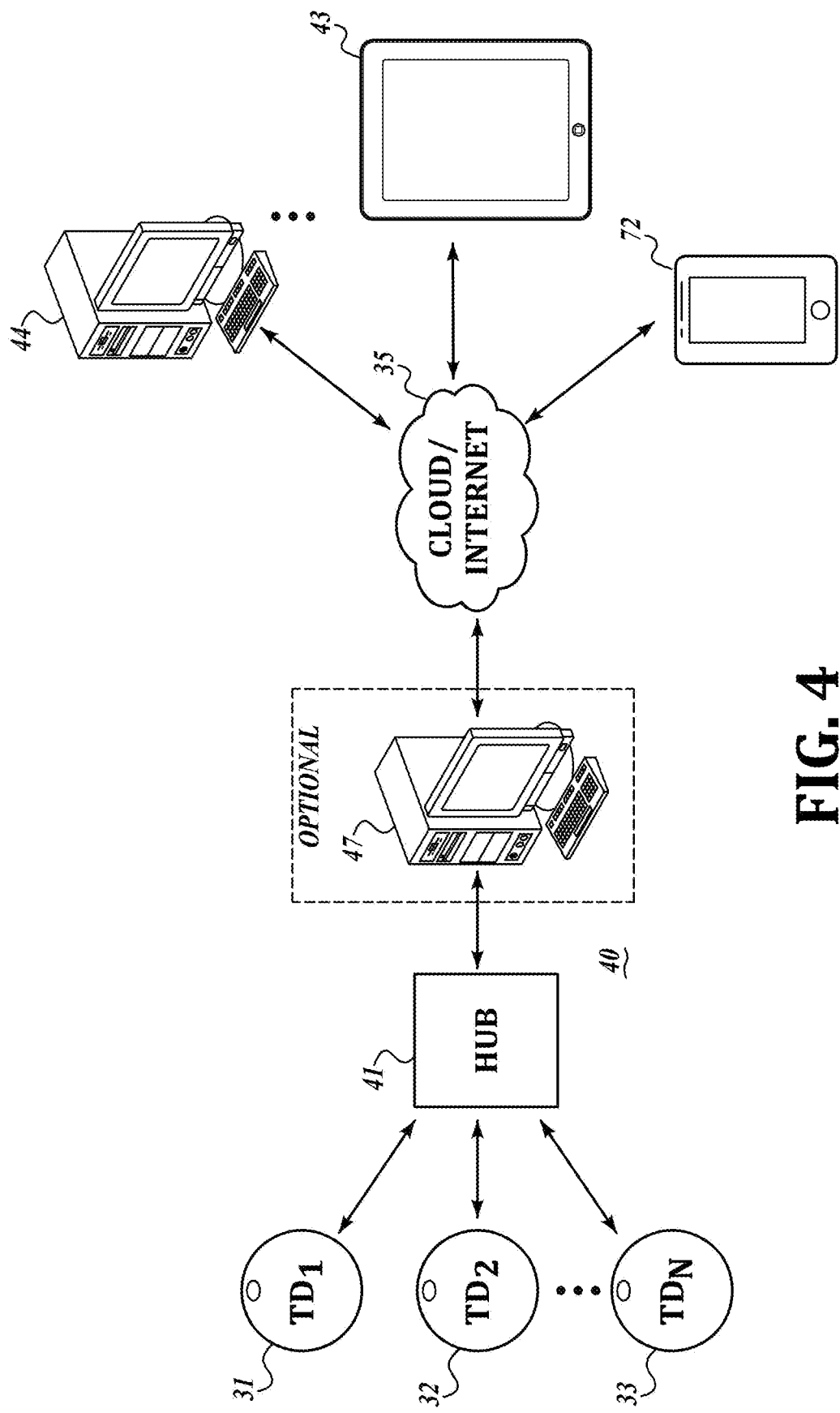
FIG. 4 is a view of a single hub (hive) tracking system.

Turning to FIG. 4, a first network 40 has tracking devices $TD_1$-$TD_N$, 31-33 that are in wireless communication with a hub 41. The hub 41 may be connected to a gateway system 47 that in turn is connected to the cloud/internet 35. In some embodiments of the first network 40, the hub 41 is directly connected to communicate with the cloud/internet 35. The hub 41 listens for signals from the tracking devices 31-33. The hub has Bluetooth or other wireless communication apparatus and can sense the range of each tracking device within its effective field. Upon receiving signals from one or more tracking devices, the hub relays information associated with the tracking devices to the cloud/internet site 35. Likewise, the hub 41 may send control information received from the cloud/internet site 35 to each or all the tracking devices 31-33.

Each tracking device 31-33 and the cloud/internet 35 associated with the devices has an owner and may have one or more shared users. As used in this patent, the term "owner" applies to a user of a tracking device 10 who has primary control over the tracking device 10 and the cloud/internet 35 associated with the tracking device. The embodiment envisions local, regional, national and international networks 43-44 within the scope of cloud/internet 35. It also envisions registered owner-users of tracking devices and others register users with one or more dedicated cloud/internet sites 35 for collecting information about tracking devices 10. An owner-user may grant one or more privileges to others, known as "friends", allowing the other users some or all access or control of the owner's tracking devices and owner's account on the cloud/internet site 35. For example, one owner-user may give a friend a privilege to view all data on the cloud/internet site 35 or view data only associated with one or more tracking devices chosen by the owner-user for sharing. Even when the owner permits other users to see the data, some data may be marked "private" and excluded from the view of the shared user. An owner may also permit other users to control one, more, or all functions of individual tracking devices of the owner. An owner may also allow device data to be posted publicly, so that any user can view the data.

The friend feature solves a potential problem of locating lost tracking devices. If a friend finds a lost item of owner, the friend may discretely notify the owner that the friend has found the lost tracking device (and the object attached to the device) by calling the owner or sending the owner an email or text message that the friend found the tracking device at a particular location and time. The email could include a map with a pin showing the location.

In an alternative friend-based scenario, assume a user of control apparatus 42 who was granted privileges for the lost device 32 by its owner detects the lost device. The owner sees on the database that the user of control apparatus 42 is close to the lost device 32 and also has privileges for the lost device 32. The owner may contact the user of control apparatus 42 via telephone or email and ask the user to find the lost device 32 by initiating a sound or light alert on the device 32.

Shared use has a number of advantages. For example, assume the owner of the device 31 is away from home and receives a call from a member of his family asking for help finding a lost remote control attached to tracking device 31. The owner could log into the cloud/internet and send a suitable command to the tracking device 31 to operate its speaker 23 and LED 24. If the owner had shared control of the tracking device with other family members, then the shared user could send the command to generate an alarm without contacting the owner.

The embodiment of first network 40 helps integrated multiple tracking devices 31-33 and Bluetooth devices. A control apparatus 37 (e.g. smartphone) does not have to control the tracking devices. Instead, all tracking devices 10 for an owner are registered in the hub 41 where each can be securely accessed from a smartphone or other control apparatus anywhere in the world. The registered tracking devices can be used for home security, automation, or playing games with friends across the world.

Figure 5:
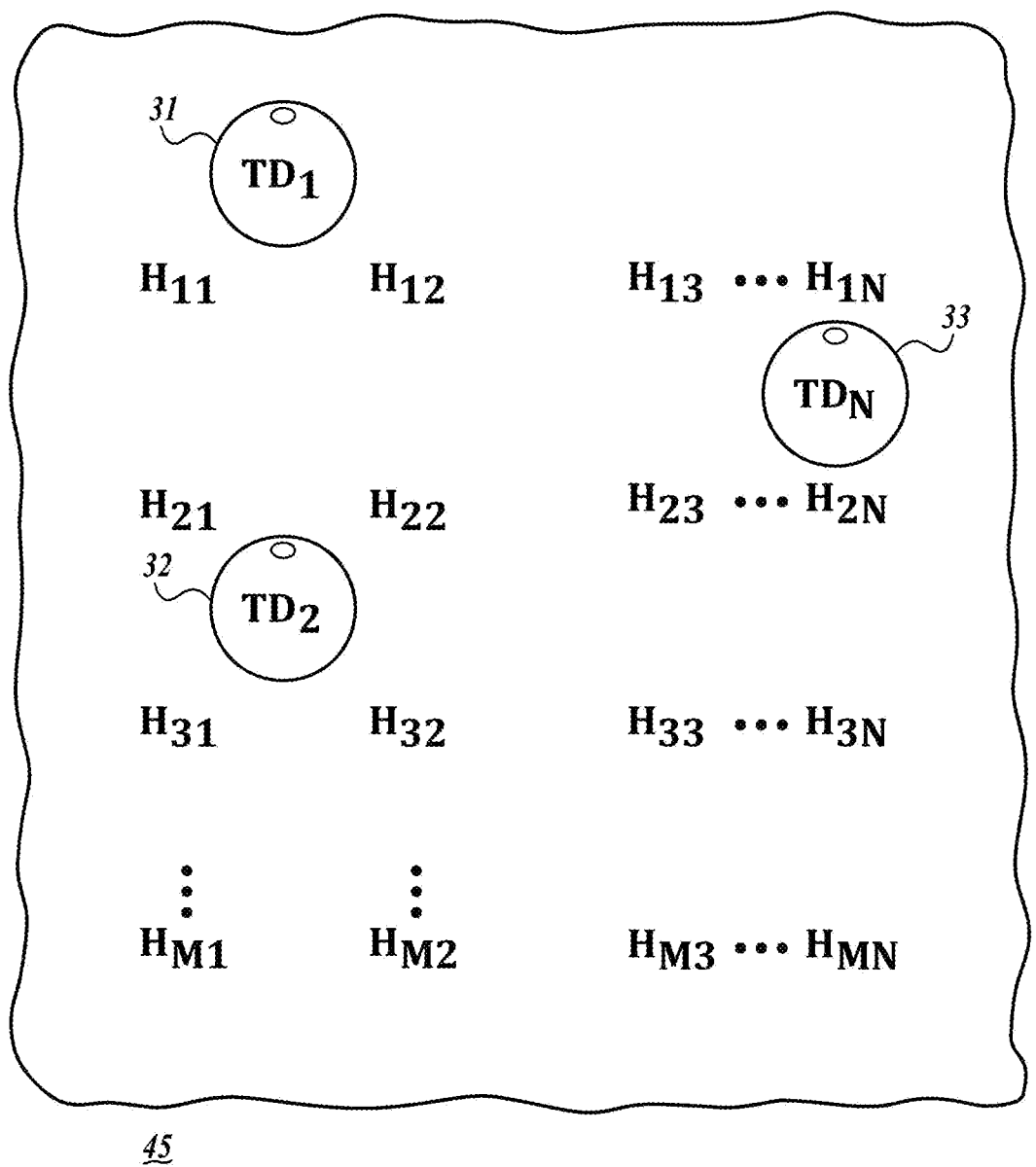
FIG. 5 is a partial view of a multi-hub tracking system.

A second, wider area network embodiment 45 is shown in FIG. 5. There are a plurality of hubs H11, H12, H21, . . . . H1N, HMN distributed over a predetermined area, such as a warehouse, college campus, hospital, airports, and offices. In a warehouse, tracking devices 31-33 are attached to stored items and any particular stored item can be immediately located by triangulating its position from the range signals detected by the hubs. On a college campus, the tracking devices could locate a lost smartphone, computer or book. In hospitals and offices the tracking devices could be attached to files so that anyone could find a desired file by accessing the cloud/internet 35.

Figure 6:
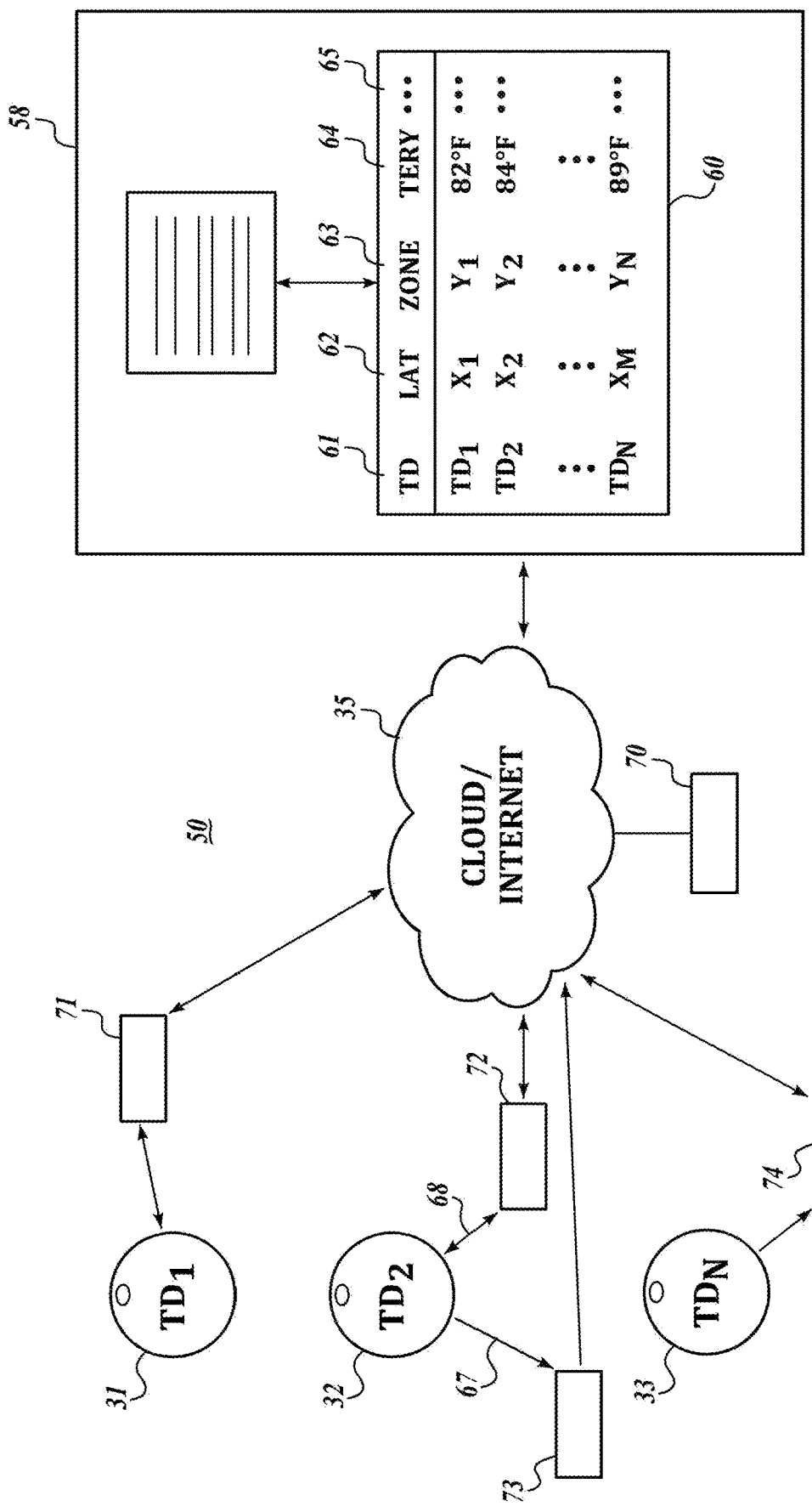
FIG. 6 is a view of a wide area location system for finding lost tracking devices or monitoring multiple sensors in tracked devices.

A third network embodiment 50 is shown in FIG. 6. An owner of multiple tracking devices 31, 32, 33 operates a networked control apparatus 70 that has two-way communication via cloud/internet 35 with the tracking devices 31, 32, 33. A server 58 is also in two-way communication with the cloud/internet 35. The server 58 includes one or more databases 60 that keep records on owners, users and each tracking device. For user of the network 50, the database 60 would show the devices owned by the user or those devices for which the user had granted or received one or more privileges or are marked for public access, the identity 61 of each device that is owned or subject to a privilege granted or received, the information 62, 63, 64, 65 reported by each sensor of each device, including and not limited to the time the information was received and the location of the control apparatus that receives the information. At any time the owner 70 of the tracking devices 31-33 may view the historic information on the location and sensors of each tracking device of the owner, including the last known location of the tracking device and when the last known location was recorded in the database 60.

The owner's control apparatus 70 may be beyond the range of the transceivers in core devices 21 of the tracking devices. A number of other control devices 71-74 may be within range of one or more of the transceivers 21 in the tracking devices. Each tracking device uses its core device transceiver 21 to broadcast a periodic beacon signal with information including the identity of the tracking device and information from the sensors 25-27 of the respective tracking devices. Each control apparatus 71-74 receives the beacon broadcast 68 and relays the information in the broadcast in a transmission to a designated host on the cloud/internet 35, including the GPS location of the control apparatus. The control apparatuses 71-74 do not need permission from the owner of the tracking devices to receive and forward the identity and sensor information. As long as the control program 100 for tracking devices is running, each control apparatus will receive the beacon signal from the tracking devices. No permission is required to receive the beacon signal. The control apparatus may add a location and/or a time stamp, and other information, to a "record" of the transmission from the tracking device before forwarding the record to the cloud host. The retransmission of beacon information by the control apparatuses 71-74 imposes no hardship on them because each one likely transmits its own beacon signal to a cellular phone network or a local or wide area network.

The third network embodiment 50 may be used to locate misplaced items that are beyond the range of a control apparatus. An owner may access the database 60 and mark one or more of the owned devices as "lost." Assume that device 32 is owned by the operator of control apparatus 70 and is attached to a tablet computer (not shown). Assume another user carries control apparatus 73 and has no shared privileges for tracking device 32. Nevertheless, when control apparatus 73 passes within range of the beacon signal 67 from tracking device 32, the identity of the lost device 32 and its approximate GPS location will be relayed via control apparatus 73 to the cloud/internet 35 and recorded on the database 60. That allows the owner to know the general location of the lost device 32. The approximate location can be displayed on a suitable application such as Google Maps, or MapQuest to provide the owner with local streets or landmarks where he may physically search for the lost device.

The database has numerous uses. Tracking devices 33 may be distributed over a large geographic area where each tracking device is in communication with a hub, such as shown in FIG. 5. The tracking devices may be located at one or more known locations or the hubs may provide GPS data. The sensors on the tracking devices could report their temperatures, air pressure, humidity, and other environmental characteristics via the hubs to provide data for a database 60 of the variable environmental characteristics of the geographic area.

There is a virtually unlimited number of sensors that can be used to provide trigger signals and a similar unlimited of responses or alerts that may be given in response to the trigger signals. Each tracking device has a button 14a and may have one or more sensors 25-27. The button and each sensor may generate a trigger signal. Trigger signals may be combined in any number of combinations and/or sequences of trigger signals to generate particular trigger signals depending upon the occurrence of predetermined combinations and/or sequences of trigger signals. The tracking devices and control apparatuses may also generate one or more responses or alerts upon receipt of trigger signals and combinations thereof.

Button 14a may be pressed one or more times to generate one or more button trigger signals. Two or more sequential pressings of the button 14a are an alternate trigger signal. The button switch may be held down to generate a long duration trigger signal or promptly released to generate a short trigger signal. A combination of long and short duration signals may also be used as a trigger signal.

For embodiments having a 9-axis sensor, any motion or combination and/or sequence of specific types of motion may be used to generate trigger signals. For example, when a tracking device 31 is used to secure a door or a window, any motion of the sensor may be a trigger signal. In other embodiments, specific user-defined spatial displacements are received and stored in the control apparatus as trigger signals for a response. For example, moving a tracking device left to right, shaking the tracking device up and down, moving the tracking device to define a letters, such as the letter "L", or moving the tracking device to define a shape such as a circle or square, are but a few custom motions. The shapes and letters could be paired with a click of the button 14a to indicate the start of a motion and second click when the custom motion is completed. The control apparatus would remember the click to start and stop and the motion between clicks.

Range is another trigger for the tracking devices. On the control apparatus the user may define one or more ranges for generating responses including alerts. One potential use is keeping a parent advised of the relative location of a child while shopping in a store. Different responses or alerts could be given at different ranges as the distance between the child and the parent varies. In the hive system of FIGS. 4 and 5, a trigger may be given when a tracking device leaves or enters the hive.

Location is a still another trigger. In some embodiments, the tracking device may carry its own GPS device and broadcast its latitude and longitude coordinates. In other embodiments, the tracking device may rely upon the GPS coordinates of any control apparatus that participates in systems such as shown in FIGS. 4-6 and is within range of any tracking device. In still other embodiments, the location of one control apparatus 37 may be paired with the range of one tracking device. For example, in the basic system shown in FIG. 4 control apparatus 37 provides the location of the control apparatus using its GPS function and pairs that location with the range between the control apparatus 37 and the tracking device 31. A user can have an alert triggered when the distance between the control apparatus 37 and the tracking device 31 exceeds a predetermined distance selected by the operator of the control apparatus 37. A user can also set an alert that is only active at a "home" location to remind the user to take a laptop to which the tracking device 31 is fixed when the user leaves home. However, if the location were different from the "home" location, no alert would be given.

Time is another trigger signal. As explained above, time of day may be combined with other trigger signals to enable or disable one or more alerts, such as enabling a motion alert during the night but disabling the alert during the day. Date may also be used as a trigger condition.

Other trigger signals and their combinations and/or sequences are possible with added sensors. The tracking devices of the embodiments of the invention may use any of a vast number of sensors including and not limited to sensors for motion. Distance, velocity and acceleration, temperature, pressure, magnetic fields, gravity, humidity, moisture, vibration, pressure, light, electrical fields, ionizing and non-ionizing radiation, cosmic rays, and other physical aspects of the external environment; analytes for chemical or biological substances including and not limited to sensors for detecting toxic compositions such as carbon monoxide, carbon dioxide, methane, and other hazardous or poisonous components. The tracking devices may be worn as badges by personnel to detect ambient analytes and physical parameters. The data collected by the tracking device may be sent to the data collection center 58 where others can analyze it and provide responses or alerts to the personnel wearing the tracking devices.

The control apparatus has a program (for example an "application") that allows the user to create custom trigger signals including combinations and/or sequences of individual trigger signals. The control apparatus, the tracking device or both may generate one or more responses to a trigger signals or a combination of trigger signals. The tracking device, the control apparatus or both may give responses or alerts.

Thus with more generality, the control apparatus is enabled to create conditional rules, each conditional rule comprising two parts in "IF/THEN" logical order, in which beacon signal information can be assessed in an "IF" process and assigned a truth value, and according to the truth value, a command associated as the "THEN" part of the conditional rule can be executed. In some instances, a simple sensor output broadcast from the radio tracking device will trigger execution of some control apparatus function. In other instances, the control apparatus or an associated cloud host and network may cause a remote device to execute a function. In yet other instances, the control apparatus may compare one sensor output with another sensor output and cause a function to be executed if the comparison meets or deviates from a specified value. The sensor outputs need not be parametric. A non-parametric sensor such as a button press ("switch input") may also be evaluated as part of rules-based conditional execution of functions. And in some instances, other information, such as date, time, location, and so forth, may be factored into the conditional rule. That other information may be found in the control apparatus or in a host system (such as a "cloud host") in operative communication with the control apparatus. The functions triggerable when a conditional rule is satisfied, broadly, include alerts, notifications, and command execution of functions by any of a control apparatus, a remote device, or in some instances, execution of a function by the tracking device, such as actuation of an alarm display by the tracking device. In another example, when the conditions of a conditional rule are met by information contained in a radio-beacon broadcast, then a friend's control apparatus may execute a display notification or sound an alarm, for example. Thus the examples provided here are for illustration, but do not limit the possibilities achievable by the capacity to write customized conditional rules having a trigger condition (IF) and an executable (THEN) that some component of the system will execute when the trigger condition is recognized in a radio transmission.

The foregoing embodiments of tracking devices provide audible and visual alerts, but could also vibrate the tracking device upon receipt of a command or trigger signal. In the embodiments described above the tracking devices and the control apparatus may establish a remote control system between themselves to cause one of the system components to execute a function upon receipt of a predetermined command or trigger signal from the other component. For example, a custom motion trigger signal of the tracking device may remotely control the control apparatus to take a picture, send a message via email of SMS, make a phone call to a predetermined party, and combinations thereof such as take and send a picture to a predetermined party or group of predetermined recipients.

Figure 7:
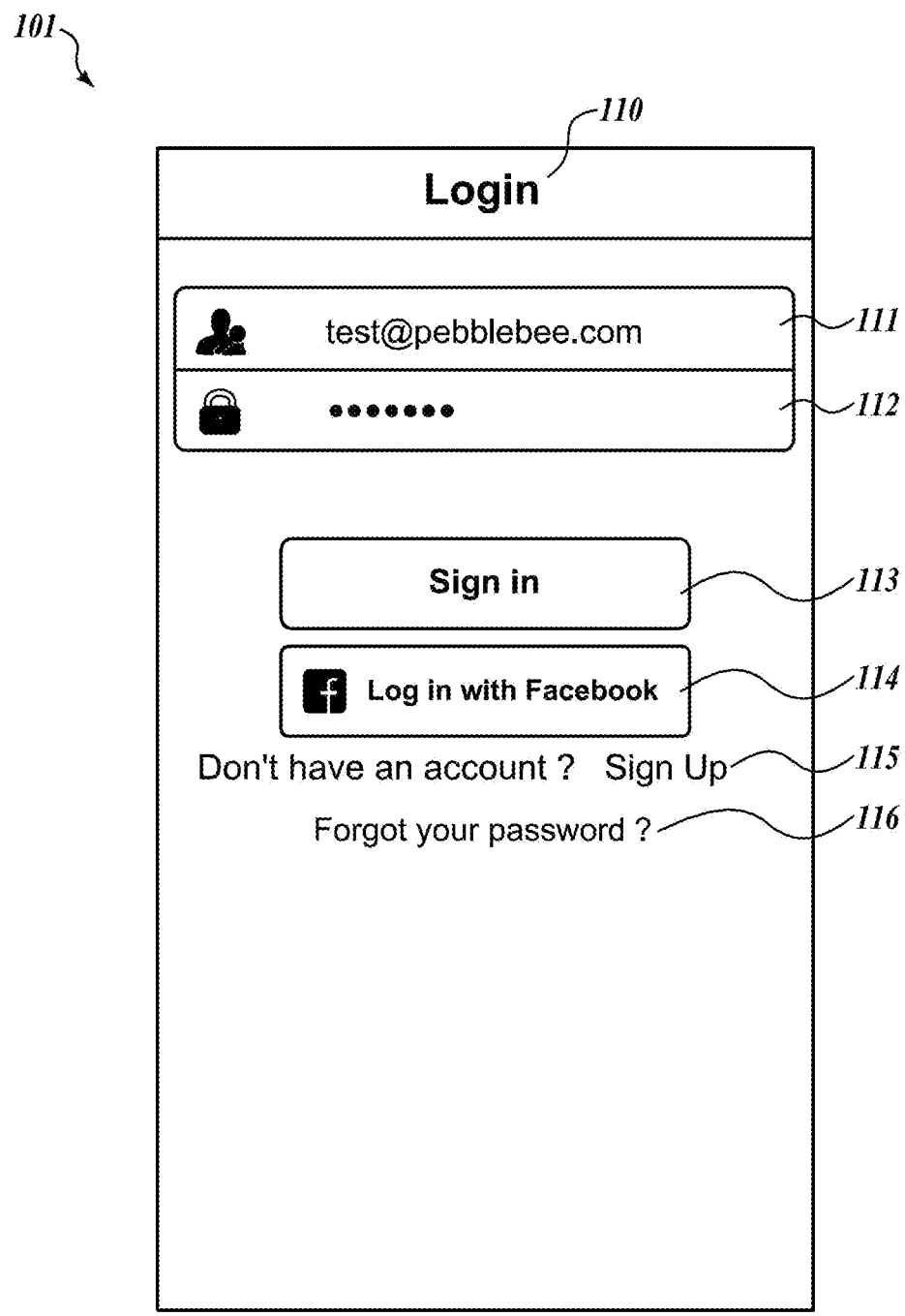
FIG. 7 is a view of screenshot 101 of a control program.

The control program 100 is shown by means of screenshots 101-109 and FIGS. 7-15. Turning to FIG. 7, screenshot 101 shows a login screen for the control program. The login screen has a legend "Login" in banner 110. Below the banner are two rows 111, 112 for a user's email address or user name and password, respectively. In row 113, the user may sign in via the indicated website pebblebee.com or, in the alternative, login through Facebook using the button on row 114.

Figure 8:
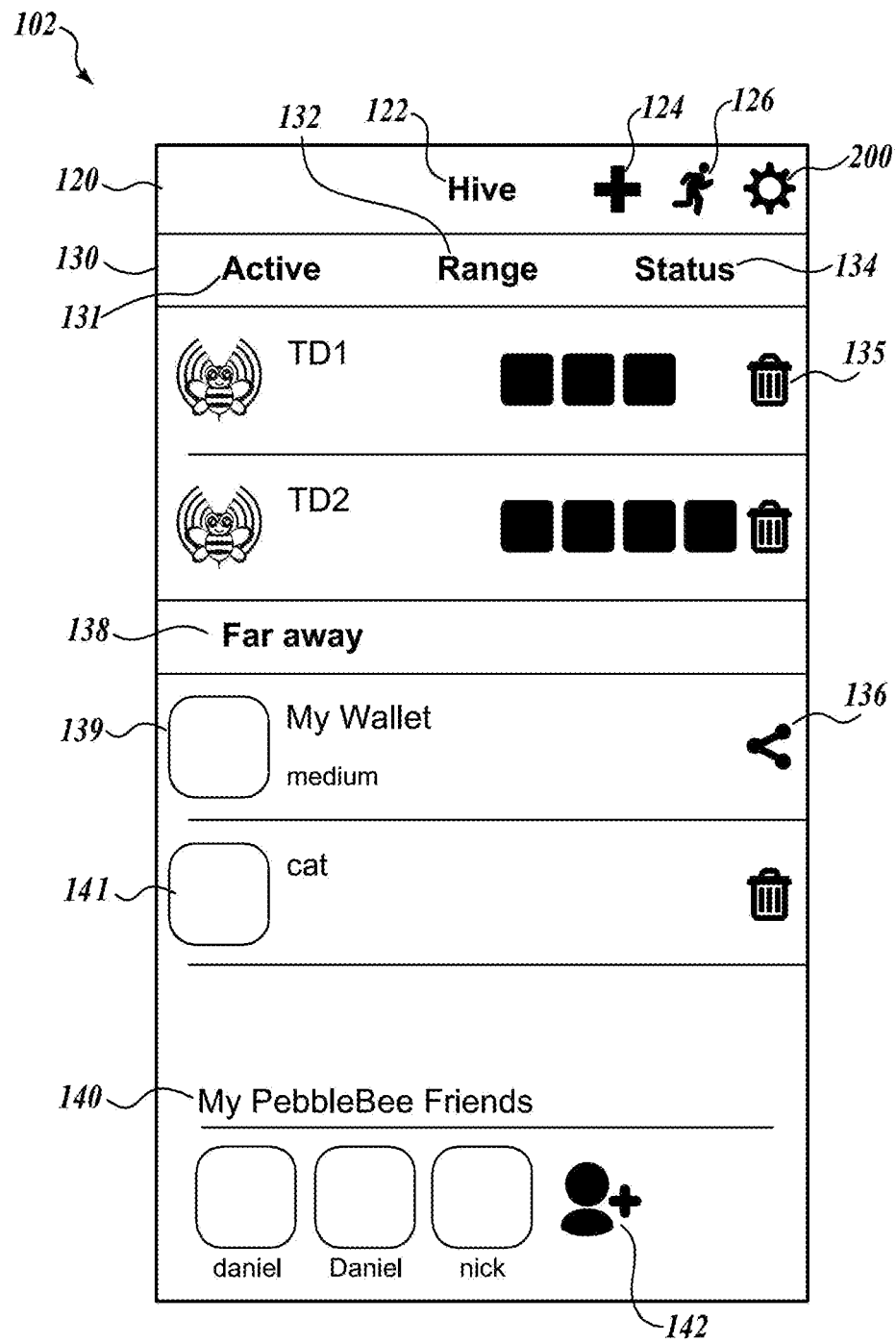
FIG. 8 is a view of screenshot 102 of a control program.

Rows 115 and 116 allow the user to set up an account or recover a forgotten password. Turning to FIG. 8, and screenshot 102, the user is presented with an image of a hive 122 of tracking devices. A hive is a group of tracking devices owned or controlled by a user of the program. In the top banner 120, there are control buttons 124, 126, and 200, respectively, for enabling the control apparatus to receive and send Bluetooth transmissions, release one or more of the tracking devices from the hive, and set general settings for the tracking devices. Banner 130 defines columns for active devices 131, their range 132, and status 134. For example, tracking device TD1 has a range indicated by three squares and a status showing a can 135. The can 135 indicates that the device is under control but may be released if so desired. In the next row, another tracking device TD2 is closer as shown by the four status squares, and it is also under control as shown by the can 135.

In the hive, there are several more devices, which are located far away. See the Far Away banner 138. Far away devices include a device identified as My Wallet 139, and another device identified as cat 141. Note that My Wallet has a Y-shaped symbol 136 to indicate that the tracking device on the wallet is shared with another user. Near the bottom of the screenshot, a banner 140 shows Friends. A friend is any other user who has some control over one or more of the tracking devices. The symbol 142 indicates a button that may be pressed to add additional friends. To the left of the symbol 142 are shown existing friends.

Figure 9:
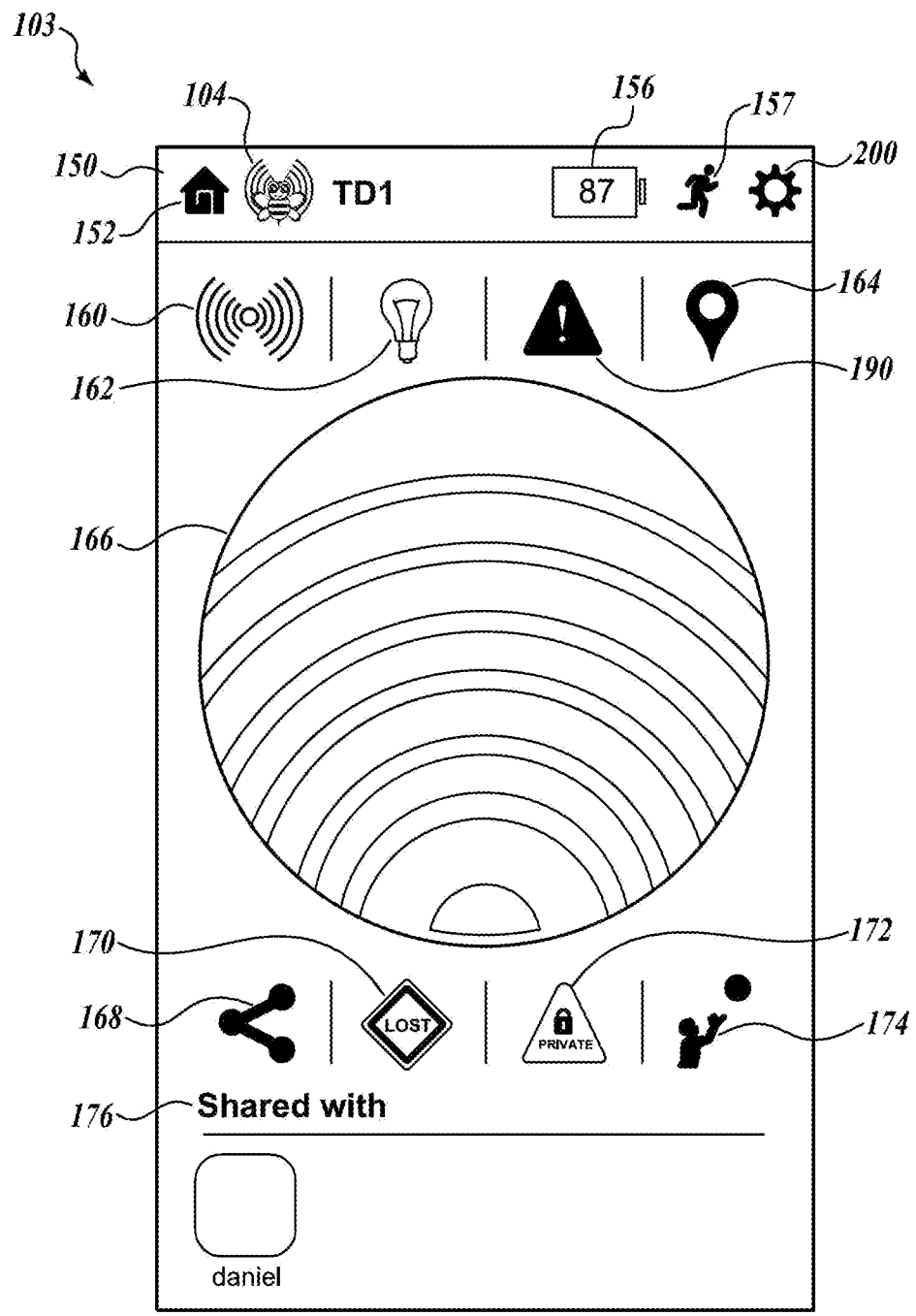
FIG. 9 is a view of screenshot 103 of a control program.

Turning next to FIG. 9, screenshot 103 shows a particular control screen for the tracking device TD1. Clicking or typing on one of the tracking devices shown in screenshot 102 accesses screenshot 103. Top banner 150 has a number of status symbols. Symbol 104 identifies the screen as relating to tracking device TD1. A user returns to the prior screen 102 by pressing the hive symbol 152. Symbol 156 shows the percentage charge of the battery, symbol 157 is the release symbol, and symbol 200 is for general settings.

Below banner 150 are a set of symbols for immediate alerts, paired alerts, and locations for the tracking device. Symbol 160 when touched will immediately sound the audible alarm through the loudspeaker of tracking device TD1. Symbol 162, a light bulb, when touched will cause the tracking device LED to emit periodic light by blinking its LED. If the tracking device is equipped with a vibrator, another symbol would be provided to indicate the vibrator. Symbol 190 allows the user to set up alerts, which include a combination of conditions as will be explained later. Symbol 164 is a mapping signal, which allows the user to acquire and display a map of the current location of the tracking device TD1.

Symbol 166 corresponds to the top cover 11 of the tracking device. The concentric arcs radiating from the bottom of the circular cover represent the relative range between the control apparatus and the tracking device. On the display, the arcs within the circular image 166 will bear different colors and will gradually fill in from bottom to top as the control apparatus comes in closer proximity to the tracking device. Below the range circle 166, the user has a number of options. The user may select symbol 168 in order to share the device with another user. By selecting symbol 170 the user may designate TD1 as lost. Selecting symbol 172 marks TD1 as private and only the user may see the data generated from TD1 as well as the location of TD1. Symbol 174 allows the user to release all control of the tracking device TD1. At that point, the tracking device TD1 may be claimed and controlled by any other authorized user. The bottom banner 176 indicates other users with whom the current user has shared TD1.

Figure 10:
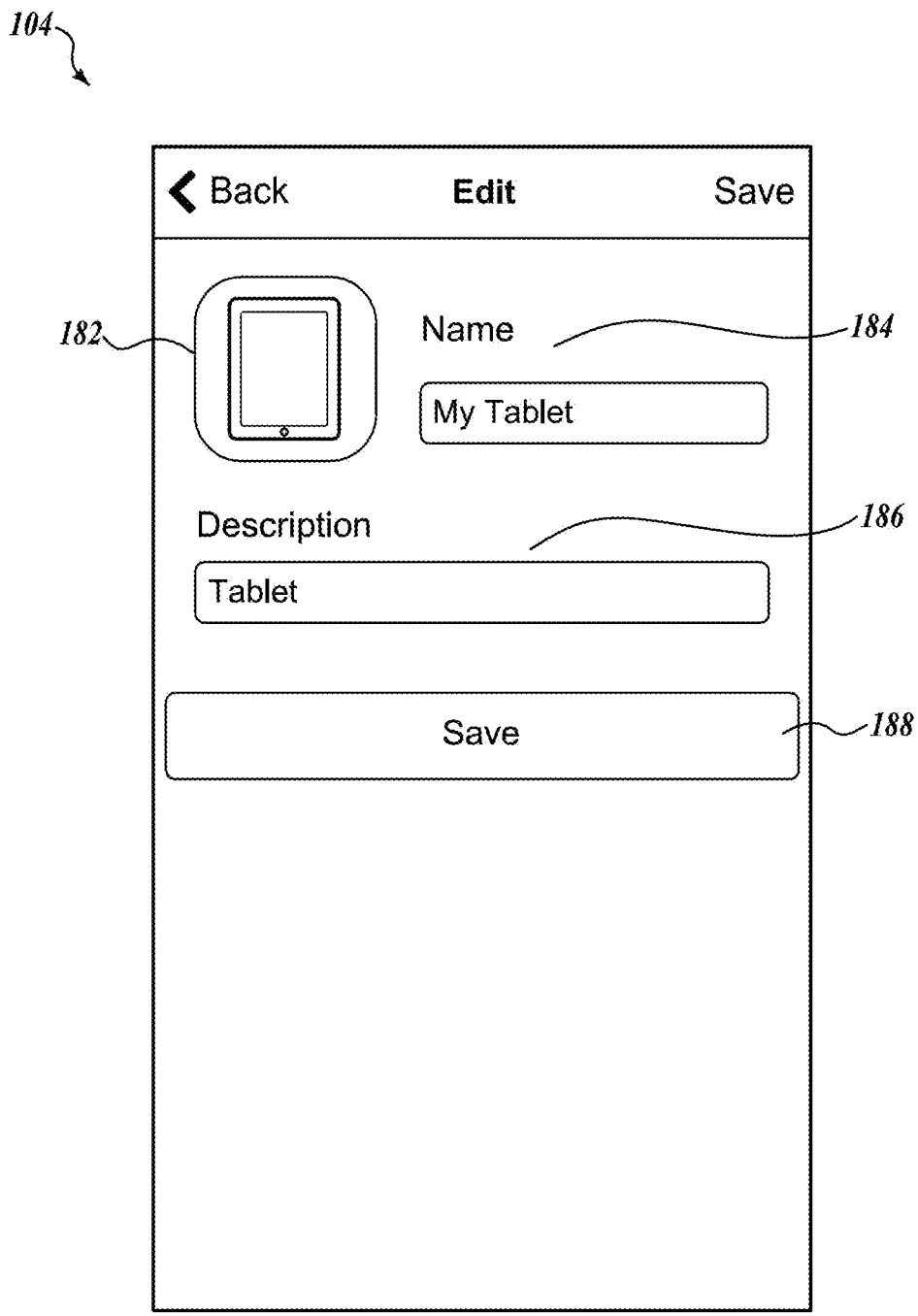
FIG. 10 is a view of screenshot 104 of a control program.

FIG. 10 shows a screenshot 104, which displays the general settings for tracking device TD1. By clicking on symbol 200 on screenshot 103, the user is taken to screenshot 104 where the user may enter particular information about the tracking device. For purposes of illustration, the user may enter a picture 182 of the tracking device or the object or person tracked. In this case, the tracking device is a computer tablet. In the entry 184, the user gave the name "My Tablet" to the tracked object. In box 186, the user may describe the object or person attached to TD1 and pressing bar 188 saves or the Save button on the top banner saves all settings. Pressing the Back button returns the user to screenshot 103. Pressing the Edit Button allows the user to make changes in the settings on screen 104.

Figure 11:
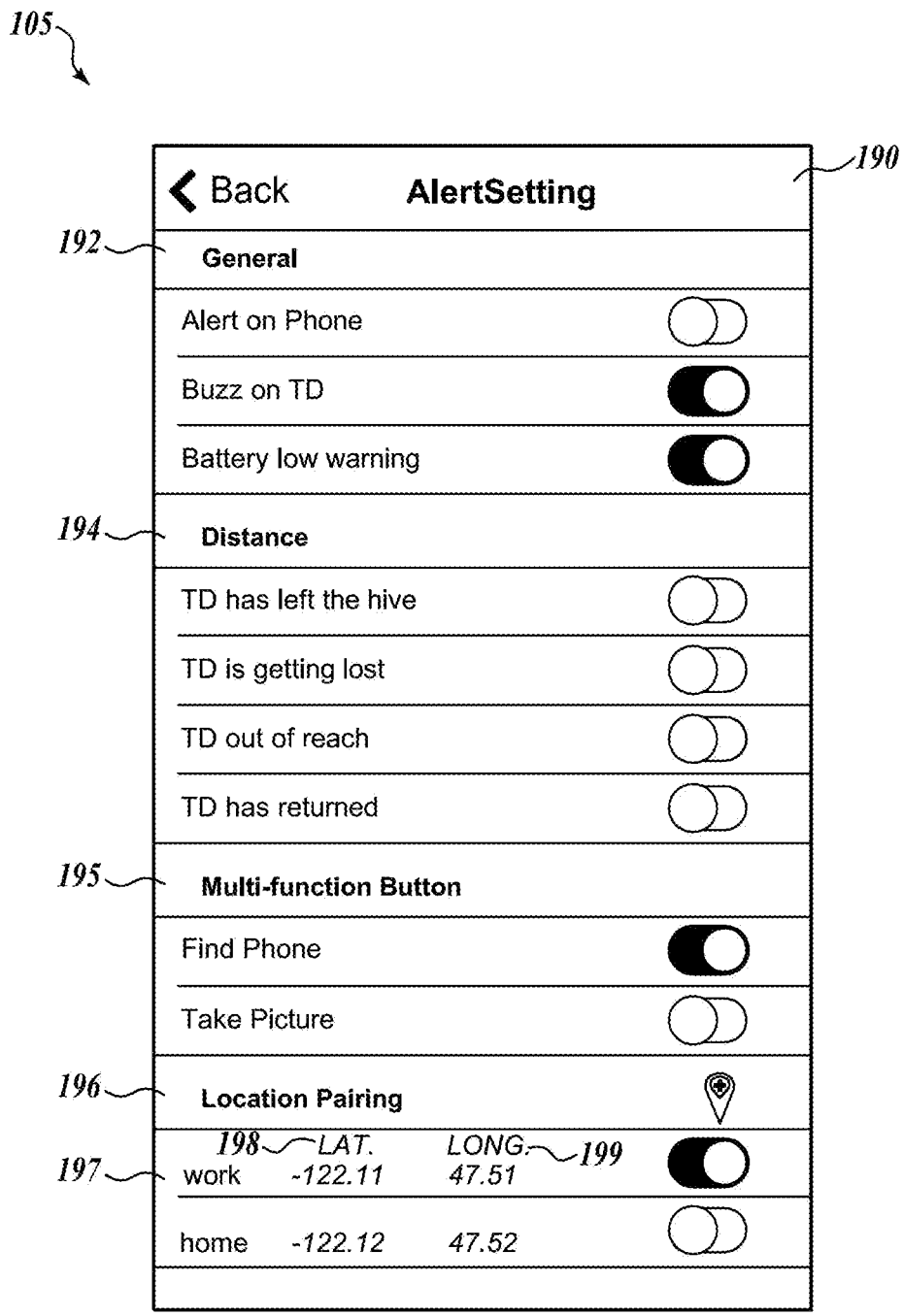
FIG. 11 is a view of screenshot 105 of a control program.

Screenshot 105 shown in FIG. 11 controls the Alert settings for the tracking device and the control apparatus. Pressing triangular symbol 190 in screenshot 103 of FIG. 9 takes the user to screenshot 105 of FIG. 11. In screenshot 105, the user has a number of options for setting alerts. The user may select alert settings 192 for the kind of alert (audio, light, vibration) and may also pair the alert with other conditions. Screenshot 105 is also used to establish remote control between the apparatus and TD1. As explained above, the tracking device may control the control apparatus 37 and vice versa. If desired, the user may have an alert show up on a control apparatus 37 such as the user's smart phone. In addition, the user may operate a loudspeaker on the tracking device. The user may also ask for an alert when the battery is low. Other alerts may be set for distance. For example, in the Distance alerts 194, the user has the option to set alerts for when the device leaves the hive (i.e., the range of the control apparatus), when it is nearing the edge of the hive, when it is out of the hive, and when it returns to the hive.

Controls for the multi-function button 195 allow the user to find the control apparatus 37 or set the multi-function button 195 to operate the control apparatus, such as a smart phone, to take a picture. In other embodiments, the multi-function button may send an email or text message to a predetermined party. Further alert settings depend upon conditions such as location pairing 196. In this case, the alert is conditioned upon the tracking device being at work or at home. As shown in FIG. 11, the locations are identified by latitude 198 and longitude 199.

Figure 12:
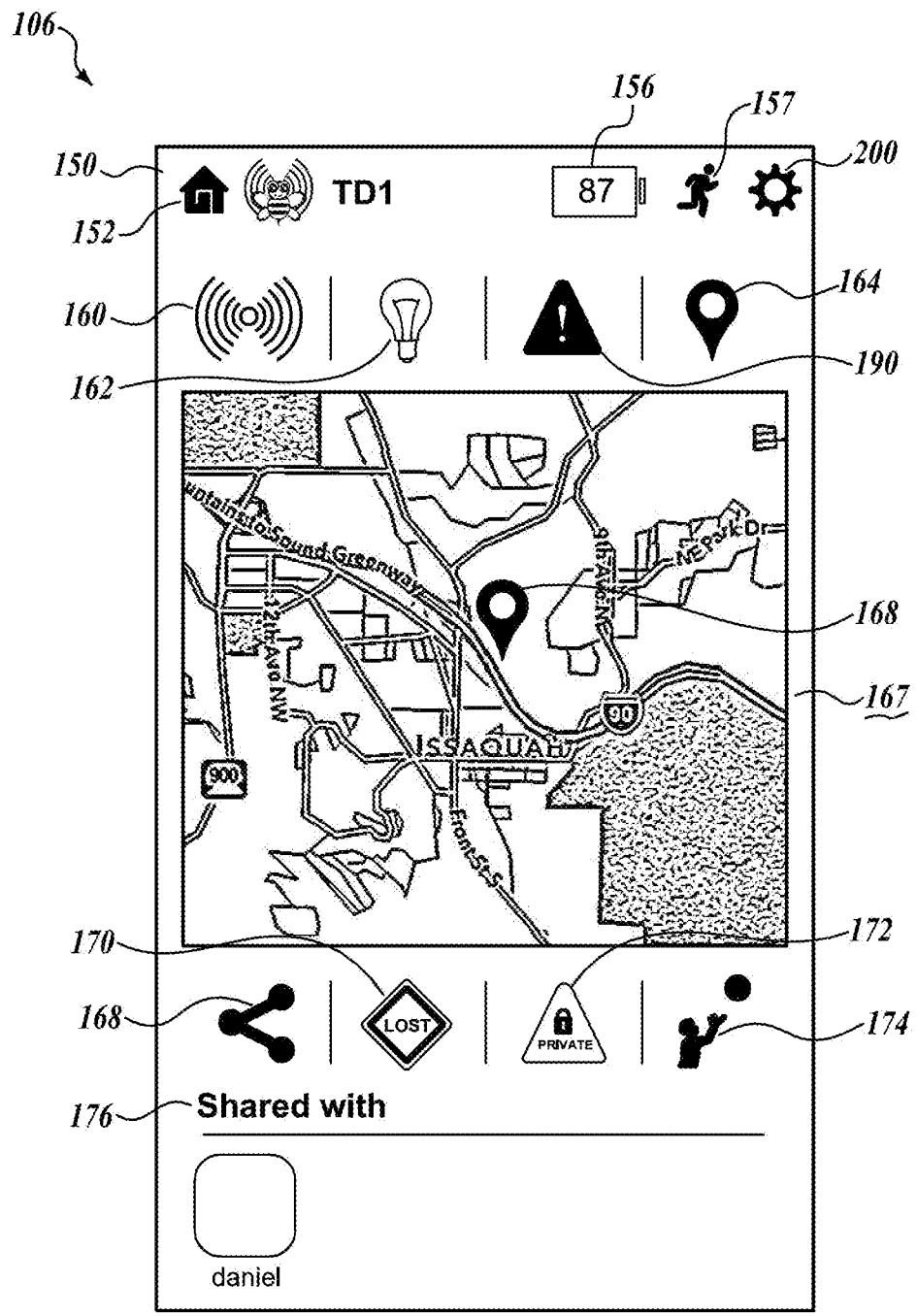
FIG. 12 is a view of screenshot 106 of a control program with mapping function.

Returning to screenshot 103, the symbol 164 is a map symbol. Touching the map symbol 164 changes screenshot 103 from the range image to a map 167 as shown in FIG. 12 and illustrated in screenshot 106. The map 167 includes a pin symbol 168 showing the approximate location of the tracking device TD1. The location of the tracking device TD1 is acquired from other control apparatuses, which have acquired the beacon signal of tracking device TD1. See, for example, the system shown in FIG. 6 above.

Figure 13:
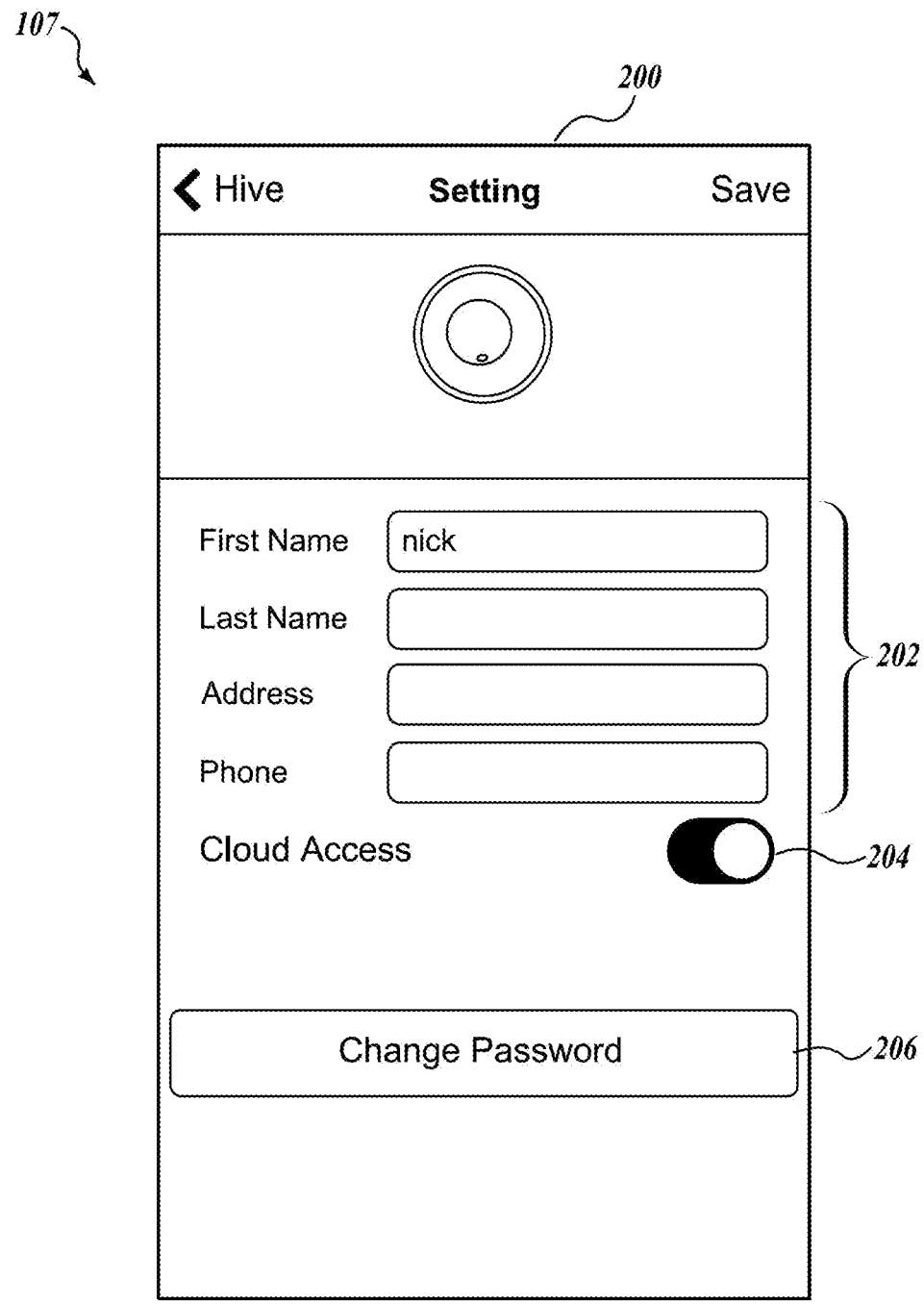
FIG. 13 is a view of screenshot 107 of a control program.

Screenshot 107, FIG. 13, shows the general settings for the user. In this instance, the user's address and information and phone number are established in boxes 202. Sliding the slide button 204 enables cloud access. The user may also change the password by clicking on the box 206.

Figure 14:
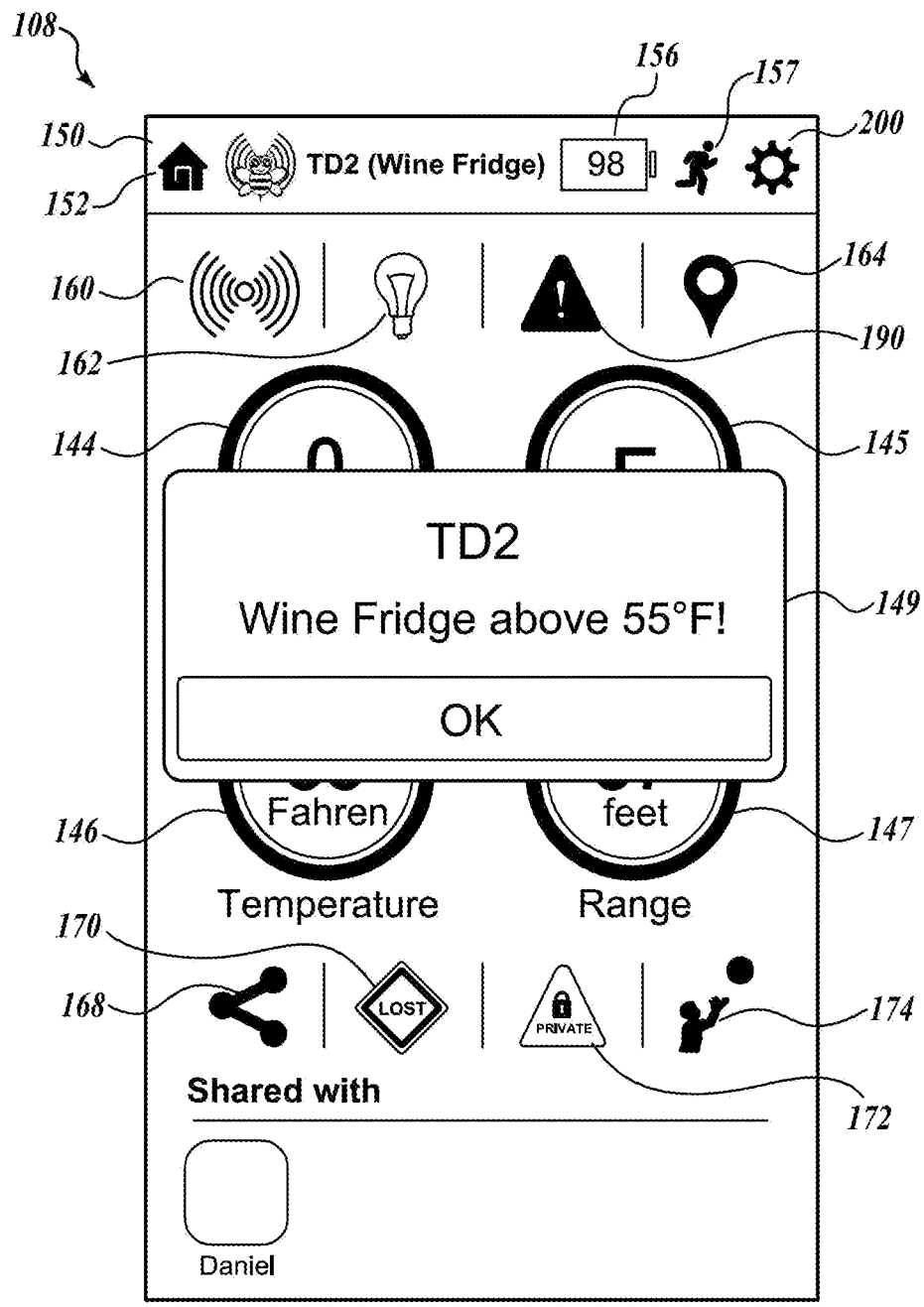
FIG. 14 is a view of screenshot 108 of a control program showing temperature metrics.
Figure 15:
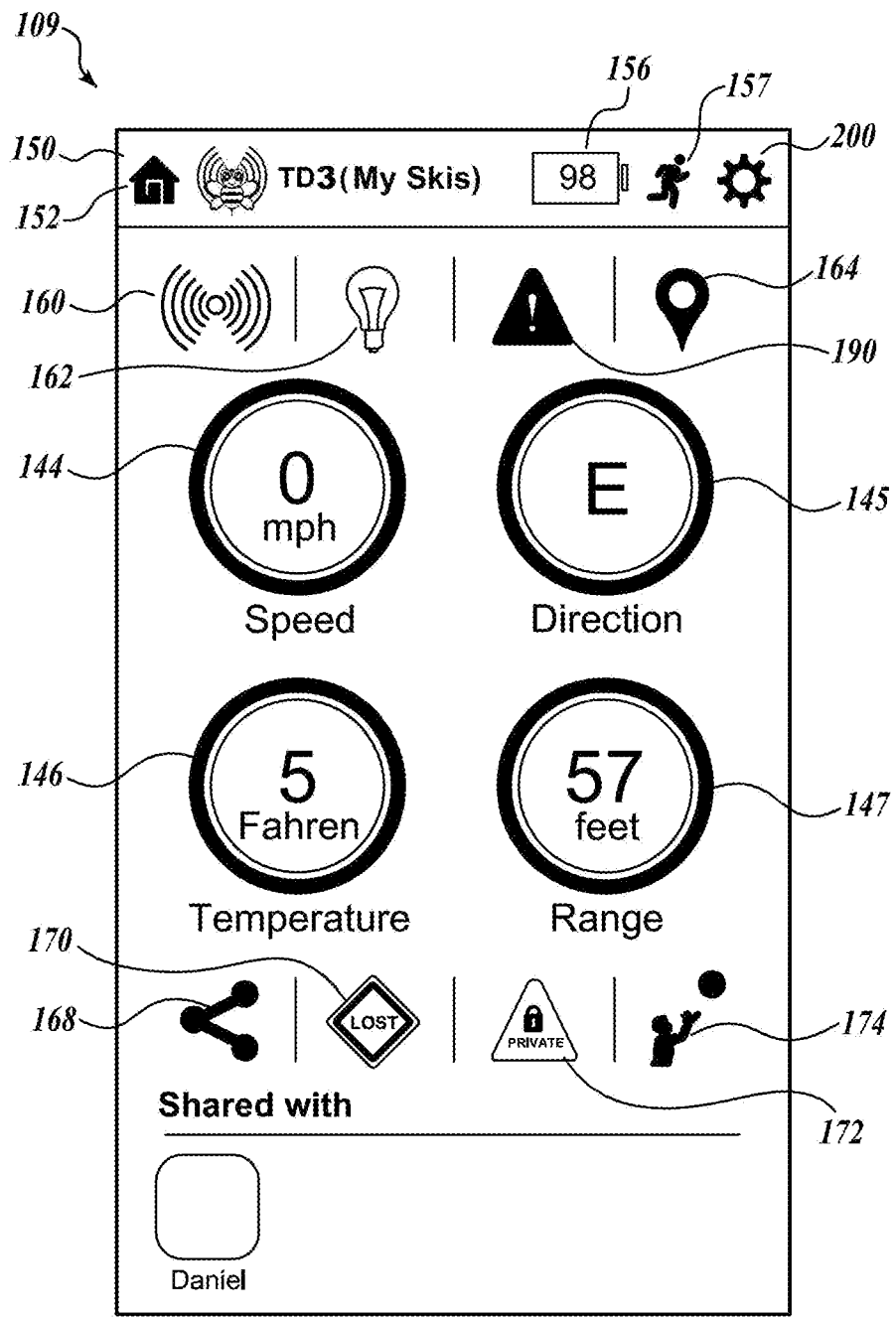
FIG. 15 is a view of screenshot 109 of a control program showing performance metrics of a snowboard or ski-mounted tracking device.

Screenshots 108, 109 in FIGS. 14, 15 show alternate views of screenshot 103 for status of tracking device TD2 or TD3, each of which has a 9-axis motion sensor as well as a temperature sensor. In an example shown in FIG. 14, the tracking device TD2 is used to monitor the temperature of a wine refrigerator. Nevertheless, it displays the 9-axis information of the TD2, including its speed 144 and direction 145, as well as its range 147 and temperature 146. The temperature alert is set to 55° F. If the condition of the temperature changes and rises above 55° F., an alert is sent to the control apparatus. The alert appears on screenshot 109 in the display of the control apparatus with the banner alert 149 showing that TD2 Wine Fridge is above 55° F. Alert 149 on the control apparatus appears not only on the display, but also may trigger a vibration of the control apparatus and/or an audible signal as well as the banner notification, depending on the programming 100 (FIG. 3)

Example I

In the example shown in FIGS. 15, 16, 17, 18, 19, 20, 21, 22A and 22B, a tracking device TD3 is used to monitor the condition and status of a pair of skis to which the tracking device is fixed, as analogous to the earlier discussed of a snowboard with reference to FIG. 3. TD3 may include a heading sensor with gyroscope, compass and accelerometer as well as a temperature sensor. The tracking device may display current heading, velocity information, mechanical strain on the ski (or snowboard), and other performance data of the TD3, including its current speed 144 and current direction 145, for example, as well as its range 147 from the receiving radio unit and current temperature 146. Current speed and direction may be toggled to represent speed and direction relative to the receiving control apparatus 37 or relative to a global frame of reference—both measurements are useful depending on context. A data logger (FIG. 24, 412) may be included to track performance measurements not displayed in real time. Performance alerts appear on screenshot 109 in the display of the control apparatus (such as by banner 149, FIG. 14) showing that TD3 is not moving and is an easterly direction from the user, for example. Alert 149 on the control apparatus appears not only on the display, but also may trigger a vibration on the control apparatus (such as a smartphone or smartwatch) and/or an audible signal as well as the banner notification. Note that these features are synergic with location tracking, and may be operated as a supplement to a lost-and-found service for the ski item, for example, and alternatively may be part of the user experience (UX) in which the user can review ski velocity, strain, acceleration, vibration, and other performance measures. Details of the electronics are described in FIG. 24 and FIG. 25, and may include a sensor package 460 and an optional cellular LTE radio 500 service for more sophisticated tracking and location functions plus a suite of performance measurements. In this instance, the display (screenshot 109) shows a range of 57 feet and a speed of 0 mph, indicating that the skis are nearby and stationary, and a temperature of 5° F., suggesting that the skis have been left outdoors. Optionally the cellular modem may include a GPS sensor circuit and associated antenna. Other sensors may be incorporated as described with reference to FIG. 24 and FIG. 25. BT radio transmission range may be from 100 yards to 500 ft or more, depending on transmission power used.

Various banner alerts 149 may be incorporated. By analogy, a sample "ALERT: SKIS LEFT BEHIND" may be generated by use of comparative accelerometry to detect discrepancies in motion or heading signal data from a group of tracking devices as described in parent application US Pat. Publ. No. US2021/0274315. The data may be interpreted by a smartphone or cloud assistant to determine which if any tracking device is lost or left behind. Similarly, an OUT OF RANGE alert will occur if any member of the group loses radio contact with the "control device" (referring to an owner's smartphone, for example). A WAYWARD OBJECT may occur if the control device is moving in one direction or at one velocity and an object is moving in another direction or at another velocity. This is more likely to suggest that the object has been taken without permission. By actuation of a LOST icon or button 172, the user can record the object as missing and can use cloud host 35 resources to find and track the lost object with which the tracking device is associated. The WAYWARD OBJECT alert may occur in conjunction with a geofence that defines a "safe zone" or a geofence that defines an "exclusion zone". Not all alerts relate to location. An OVER LIMIT alert can occur if sensor data exceeds a preset threshold. Similarly, an UNDER LIMIT alert can be pre-programmed. "Over" and "under" sensor limits are useful for example in the wine chiller example shown in FIG. 14 (screenshot 108). A SEND HELP alert to cloud host 35 or a friend's smart device, or a community of users, can occur if there is a sudden impact, a rapid increase or decrease in accelerometry data, a sharp noise, very low temperatures, or sustained shaking, such as in the event of a fall or an avalanche while skiing. If able, the user can confirm a need for help or clear the alert by pressing the alert button or icon 149 or can pre-program the multifunction button 14a (FIG. 1A) of a tracking device to respond to a steady pressure or a distinct pulse sequence on the button by causing the cloud host server to communicate a possible injury or threat to a 911 operator and provide a location of the radiotag. Another alarm alert is a LOW BATTERY alarm that can be coupled to a battery charge sensor display 156. Other alerts can readily be programmed using basic rules-based instructions and one or more sensor conditions.

If the LOST button 172 is pressed, the cloud host and smartphone are tasked to search for the device using a Bluetooth Proximity Locator Toolkit as described in U.S. Pat. Publ. No. 2021/0152976. For example, if a snowboard or skis that includes a radio tracking device (FIGS. 18 through 21) is lost, the FIND ITEM feature enables the user (or a community of users) to receive a signal when the device is detect in radio range. An alert to a user may also be activated if a radiotagged item is moved (using the accelerometric sensor) when movement was not authorized.

In some instances, as discussed earlier, the alert function (also termed a "notification") can be accompanied or substituted by an action. Using motion of a tracking device to cause the control device or other remote apparatus to take an action was an example given. Similarly, the radiotag can cause a garage door to go up, an email to be sent, a call to be placed, the smartphone to alarm, or the radiotag to give off a loud buzzing sound, for example.

Figure 16:
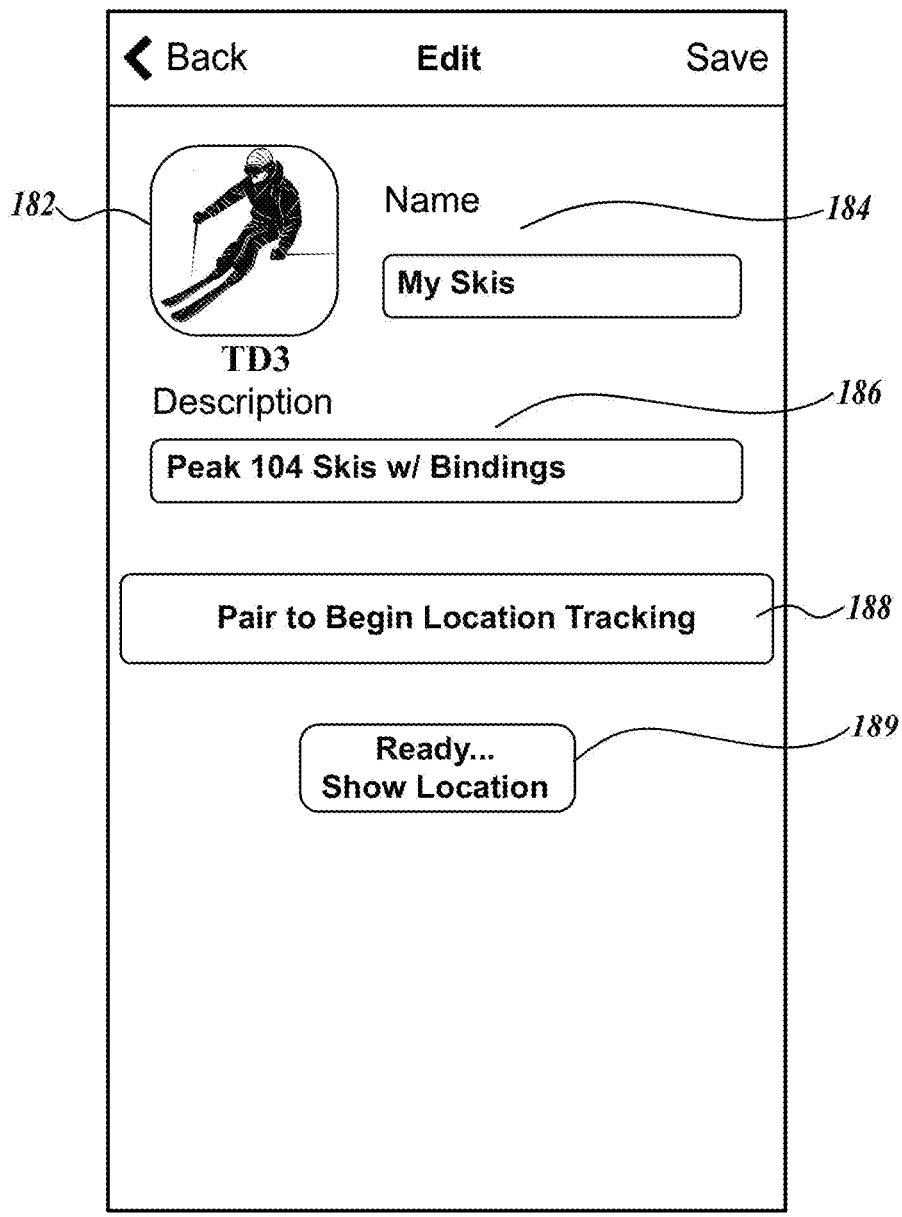
FIG. 16 is a view of a screenshot 110 of a control program, the screen having user interactive controls for setting up a location-tracking routine for a pair of skis.

FIG. 16 is a view of a screenshot 110 of a control program displayable on the screen of a companion smart device such as smartphone 37, the screen having user interactive controls operable with application 100 for setting up a location-tracking routine for a pair of skis. The item being tracked by is indicated by pictogram 182 in this example, and the user is invited 184 to name the item. Optionally the user may select a photograph from a smartphone. A more detailed description may be entered in box 186. On command 188, the control apparatus will search for a proximate Bluetooth radio signal from the tracking device, and initiate a pairing or bonding link. When ready 189, the user entries having been saved to a user profile, the device display will switch to a map view such as shown in FIG. 12 and display the current location of the tracking device and associated item or asset named 184 in the description. The user can later refer to the map view for the item to show a current location if lost. Essentially, the tracking device is acting as an internet of things (IoT) device that combines location data and sensor data in a user accessible toolkit.

Figure 17:
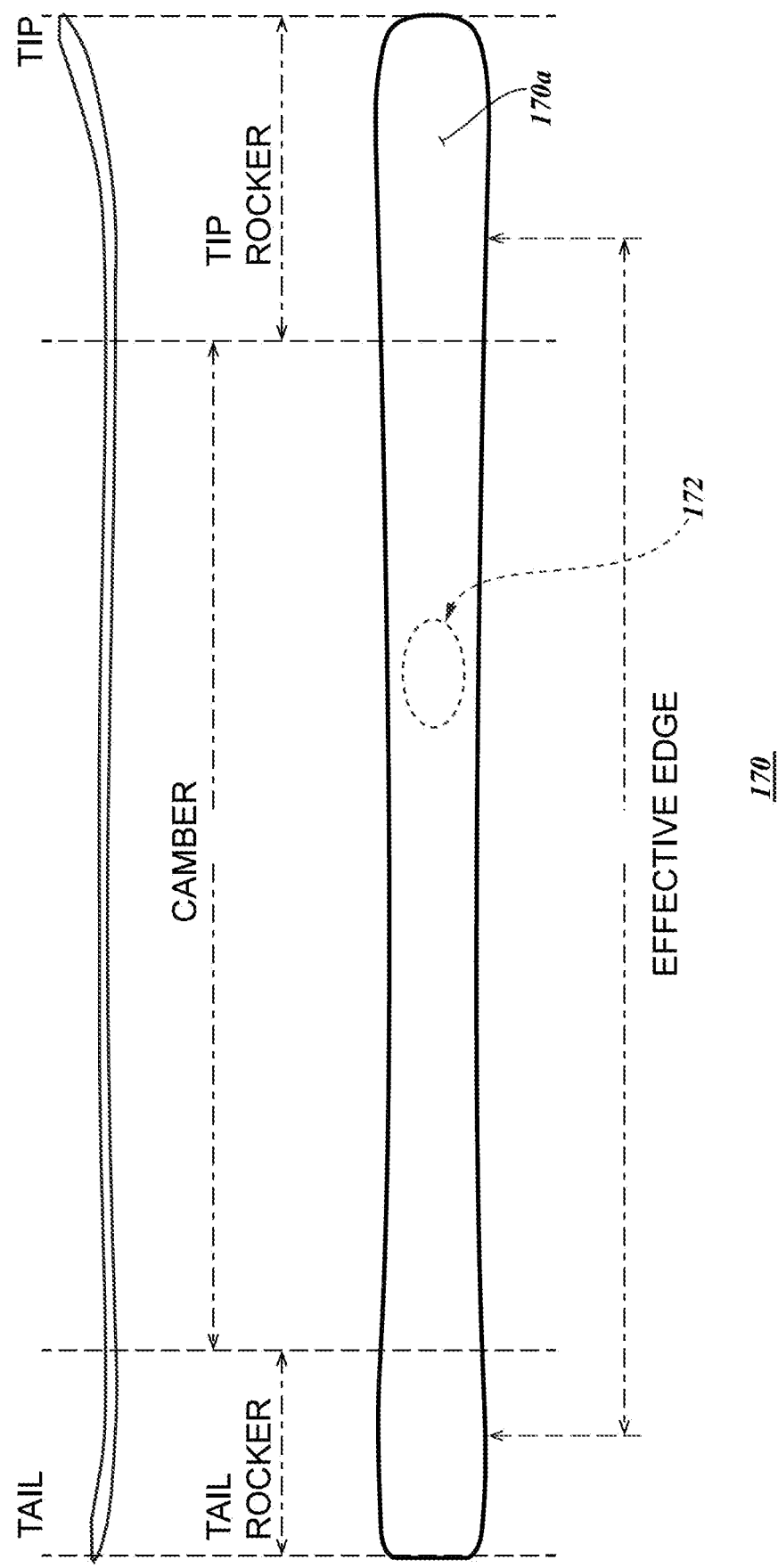
FIG. 17 illustrates an elevation and plan view of a ski 170 with radio window 172.

FIG. 17 illustrates an elevation and plan view of a ski 170 with radio window 172. In some instances, attachment of a radiotag tracking device to an item or asset is best accomplished by embedding or inserting the radio unit inside the asset or item (such as a snow sports piece of equipment). The ski 170 shown here is a good example that illustrates how the tracking device system may be used to track a location of an expensive asset that does not lend itself to simple attachment. While gluing a tracking device onto a top surface 170a would seem to provide a simple solution, the obvious concern is that the item 170 can be stolen and made untraceable just by removing or disabling the radio tag. A more compelling solution is to encapsulate the radio tag into a "core" or "substratum" (171, FIG. 18) of the asset.

However, skis flex. The mechanical properties of the ski are dependent on the materials of construction, composite layers, reinforcements, curvatures, and dimensions. Cutting edge skis may contain a radioopaque top and bottom layer of a material such as Titanal®, (Volki, Straubing, DE) which is a metal that has a high tensile strength while remaining springy and elastic. Skis are not flat planks with a tip and a tail for sliding downhill, but instead contain multiple layers formed into complex curves known as the "tip rocker", the "tail rocker", and a middle "camber", as well as any side-to-side twist or convolution. The mechanical properties of each component are all calculated into the flexural characteristics of the ski geometry. This geometry also determines the effective edge of the ski by which the skier is able to control direction and descent over variable terrain. The manufacture of skis is a complex process that is in part engineering and in part art and experience.

The core substrate may be a tradition wood or wood laminate, but there may be layers of polyester such as fiberglass and polyamide that are selected for their scratch resistance, tensile strength, and flexural modulus. Hence, the space in the substratum 172 that is replaced by the tracking device body must be calculated into the mechanical properties of the ski 170 as a whole. The challenge is to integrate or "fix" the tracking device into the ski substratum without disturbing the mechanical properties of the stack of ski material components, or perhaps even to improve the ski mechanical properties in the process of creating a radio trackable ski apparatus 180, as viewed schematically in FIG. 18.

Figure 18:
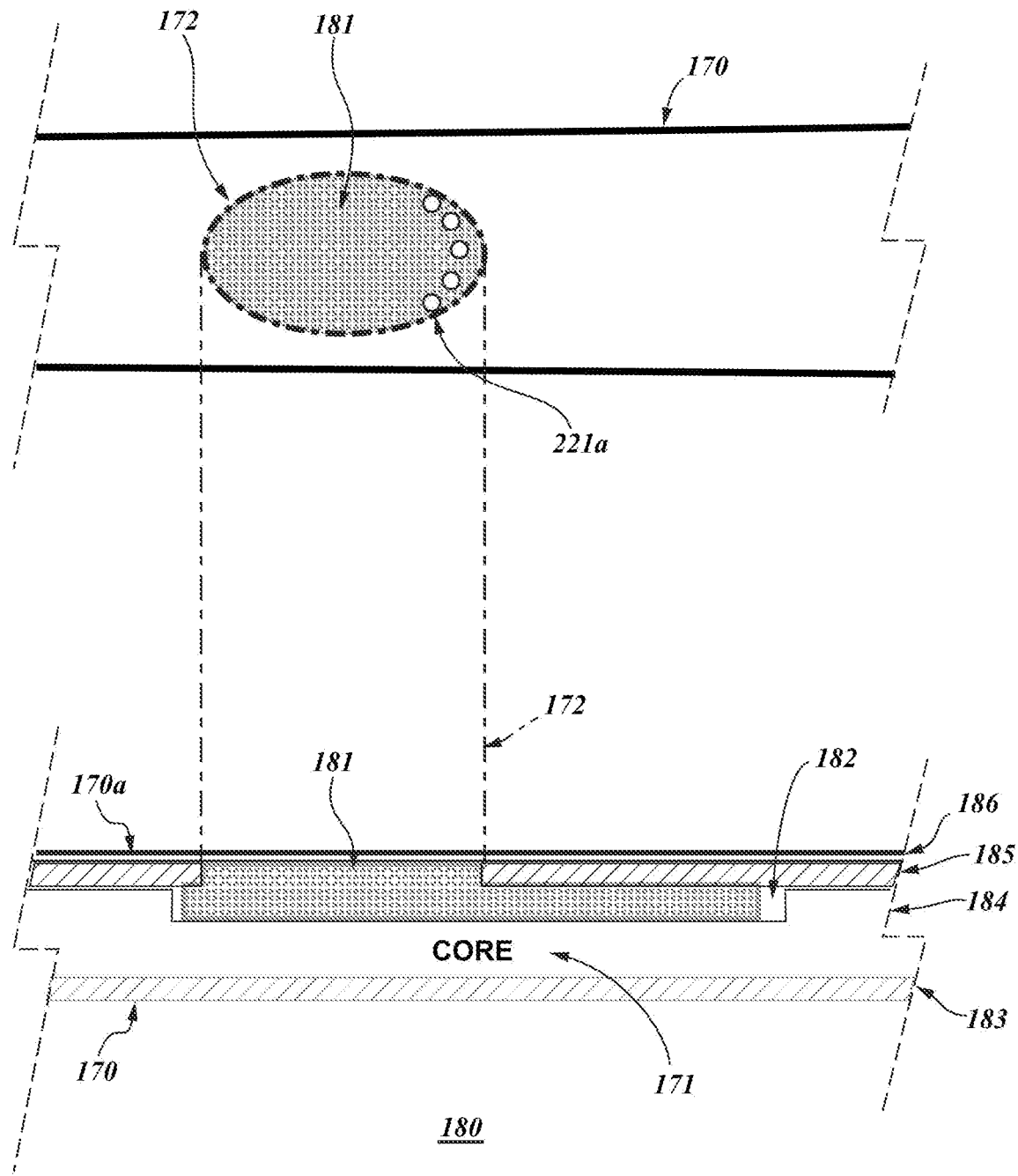
FIG. 18 illustrates a plan view and cutaway section view that illustrates a ski/radio finder assembly 180. Marked is the position of the tracking device assembly 174 inside the ski 170 under the radio window 172.

FIG. 18 illustrates a plan view and cutaway section view that shows a trackable ski/radio finder assembly 180 with radio window 172 cut in a radioopaque Titanal layer 185. A voidspace 182 is removed from the core substratum 171 to accommodate the space needed for the radiotag tracking device sub-assembly 181 and any associated encapsulant or gasket material that becomes part of the finished product. Marked is the position of the tracking device sub-assembly 181 inside the ski 170 under the radio window 172. In this example, the ski construction layers include a Titanal underlayer 183, a core or substratum composite layer 184, a Titanal overlayer 185, and a topcoat of a polyamide 186. Other layers and composites may be applied as needed. Holes for attaching fittings needed to secure boot bindings to the top surface 170a of the ski assembly 180 are not shown for clarity.

A string of LEDs used in setup and in tracking alerts is positioned at the forward end of the radio window. LED 221a may be an RGB LED, and is described in more detail with reference to FIG. 22A. The LEDs are positioned to be visible through radio window 172. For reference, the right-most end of this plan and cutaway view is proximal to the tip end of the ski, and the leftmost end is proximal to the tail end with reference to FIG. 17. The tracking device subassembly 181 is placed in the camber of the ski body 170 and does not interfere with fittings needed for mounting ski boot bindings.

Figure 19:
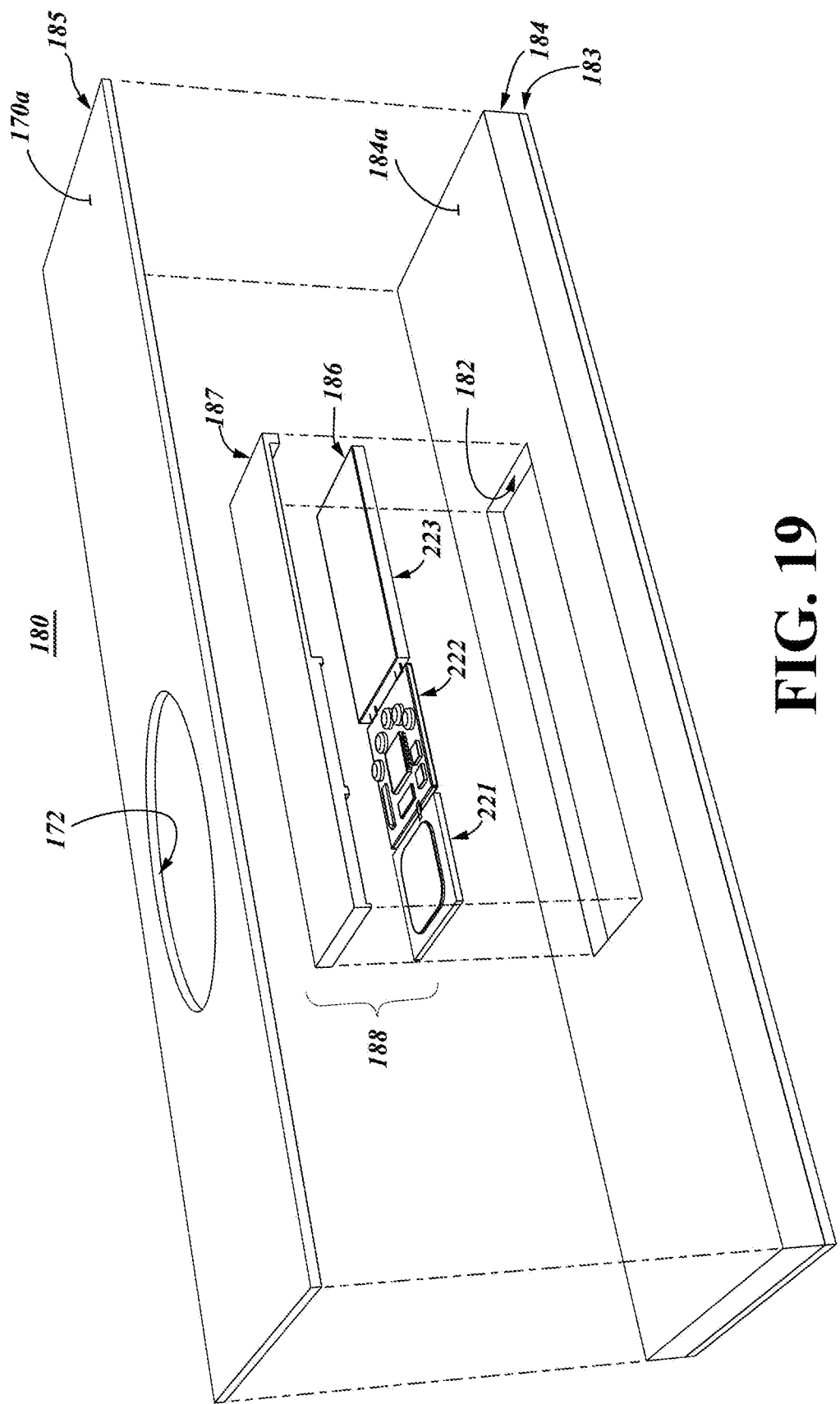
FIG. 19 is an exploded view of ski/radio finder assembly 180 with internally positioned tracking device sub-assembly as a stack 175.

FIG. 19 is an exploded view of ski/radio finder assembly 180 with internally positioned tracking device sub-assembly 181 under radio window 172. As will be described with reference to FIG. 22A, the tracking device subassembly 188 includes a tripartite body with functional segments marked 221,222,223, in which the radio antennae needed for system function are disposed under the radio window 172 in voidspace 182.

Figure 20:
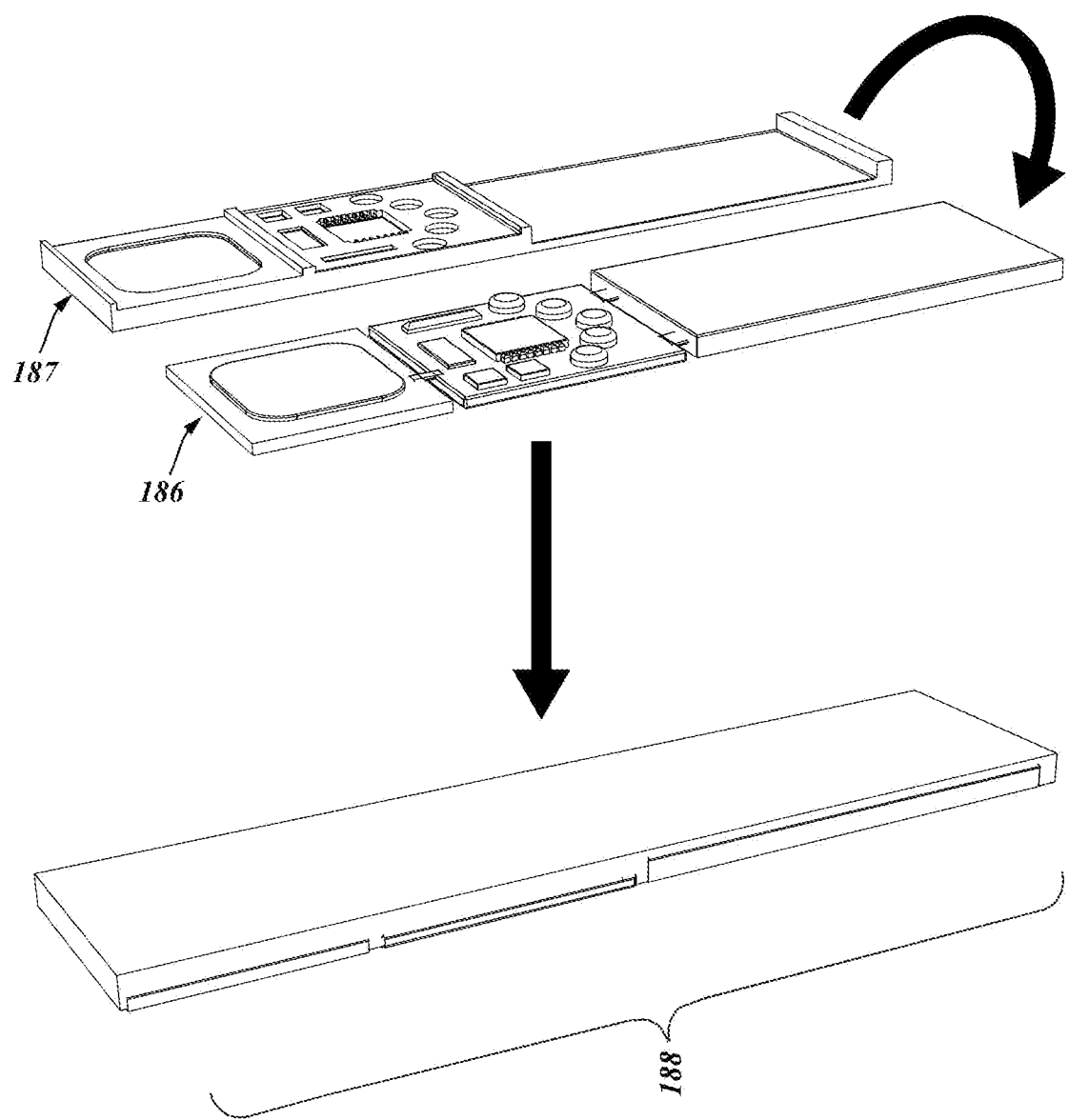
FIG. 20 is an assembly view showing a female gasket 177 that seats on top of the radio finder electronics package 176 before positioning as a stacked assembly 175 into the ski.

Serendipitously, a user interface with LEDs 210a and optional touch-sensitive features is also positionable in the radio window. As will be described with reference to FIG. 20, the tracking device subassembly may be conceptualized as a two-layered stack, in which the tripartite electronics components 186 seat under a "gasket layer" 187. The gasket material is selected to fill voidspace 182 and to have mechanical properties that are consonant with the overall flexural properties of the ski, while cushioning the electronics from shock and preventing water entry. Clearly this can be a "caste-in place" gasket, essentially potting the electronics, a conformal coating, or it can be a sub-assembly as shown in FIG. 20 in which a gasket 187 and the electronics 186 are formed as a stack 188 that is then assembled into the ski assembly 180.

While "potting in place" provides a more intimate mechanical bond between the radio unit and the substratum, it does not allow for burn-in and testing prior to the final assembly step, so any risk of a finished ski product being rejected for radio quality issues is higher. An intermediate solution is to cast a gasket or encapsulate the electronics in a separate step as indicated here, forming stacked subassembly 188, followed by burn-in and testing, followed by insertion into the ski voidspace 182, followed optionally by added potting material to fill any voidspace 182, and then final assembly of the Titanal layer 185 with radio window 172 and topcoat 186 with user interface visible through the potting material and nylon topcoat. A transparent shoe may be inserted, shaped to fill the radio window in the Titanal cutout, so as to form a smooth surface for receiving the final topcoat and sealant layer(s) 186. The encapsulation or potting may be conducted so that sub-assembly 188 fills voidspace 182 to the level of the substratum top surface 184a, so that a shoe (not shown) is inserted to raise the solid stack level to be flat with final top layer surface 170a before final assembly. Interestingly, the shoe allows the radio assembly insert to be disassembled from the ski if service is required. Alternatively, the initial encapsulation 188 can be followed by a pour-in-place embedment to level off the fill seamlessly at level 170a while preserving radio transparency and visibility of the user interface beneath a tough and firm substrate support.

Several embedding materials are useful for protecting electronic components and have the requisite mechanical properties, including a lower $T_g$ (glass transition temperature). Lower Tg materials are preferred to minimize shrinkage during hardening that can break solder bonds on the circuit boards. Polyamides, polyurethanes, polyolefins and silicone compounds having the requisite elasticity, transparency, and radio transparency have been developed. Epoxies are not the best choice because of their rigidity and incorporation of carbon black fillers to reduce light transmission is not desirable given the placement of the user interface. Polyurethanes have the advantages of curing at lower temperatures, with low exothermal effects during cure. Silicon compounds, unless fiber reinforced, tend to lack the needed flexural rigidity. EVA (ethylene vinyl acetate) copolymers are extremely elastic material that that can be processed like other thermoplastics. EVA materials have low-temperature toughness, stress-crack and UV radiation resistance. Polybutadienes also have excellent low temperature flexibility. The Henkel (Henkel Corp, Dusseldorf DE) Technomelt Polyamide Hot Melt line and Stycast polyurethane lines may also be used, for example.

In some instances, the fill, embedment or encapsulation step is completed with a formulation or composite that matches or enhances the mechanical flexural characteristics of the ski in the camber in front of the boot bindings. Torsional flexibility in this section of the ski is critical in achieving higher performance and the radio window serves a dual purpose in creating a flex point that uncouples the shovel of the ski (forward third) from the command section (rear two-thirds) such that the skier, by applying pressure through the boot binding, controls the effective edge of the ski and the front shovel section is compliant in its attack of hillocks and inclines, a discussion that is an area of intense experiment and interest to skiers. Adjustment of the mechanical properties and coupling of the tracking device subassembly 188 to the core substratum and overlying Titanal layers permits fine tuning of the overall ski torsional flex and hence, may improve, or weaken, ski performance, so that care is required to address the optimal mechanical properties of the encapsulant or embedment. The use of a tripartite body 186 fine tunes the flexibility of the integrated structure and reduces strains from developing that can damage the electronic circuit links.

FIG. 20 is an assembly view showing a female gasket 187 that seats on top of the radio finder electronics package 186 before positioning as a stacked assembly 188 into the ski. For purposes of illustration, the "gasket" 187 is shown as being rotated onto the electronics 186 components. However, it will be recognized that a direct pour in a mold can also encapsulate the electronics in a stack form as represented by sub-assembly 188. Use of a mold that is slightly larger than the printed circuit boards and battery improves the completeness of encapsulation. The tracking device sub-assembly 188 is inserted into voidspace 182 when manufacturing trackable skis 170 or other snow sports equipment having a plank-like substratum, such as snowboard 300 (FIG. 23) or splitboards known in the art.

Figure 21:
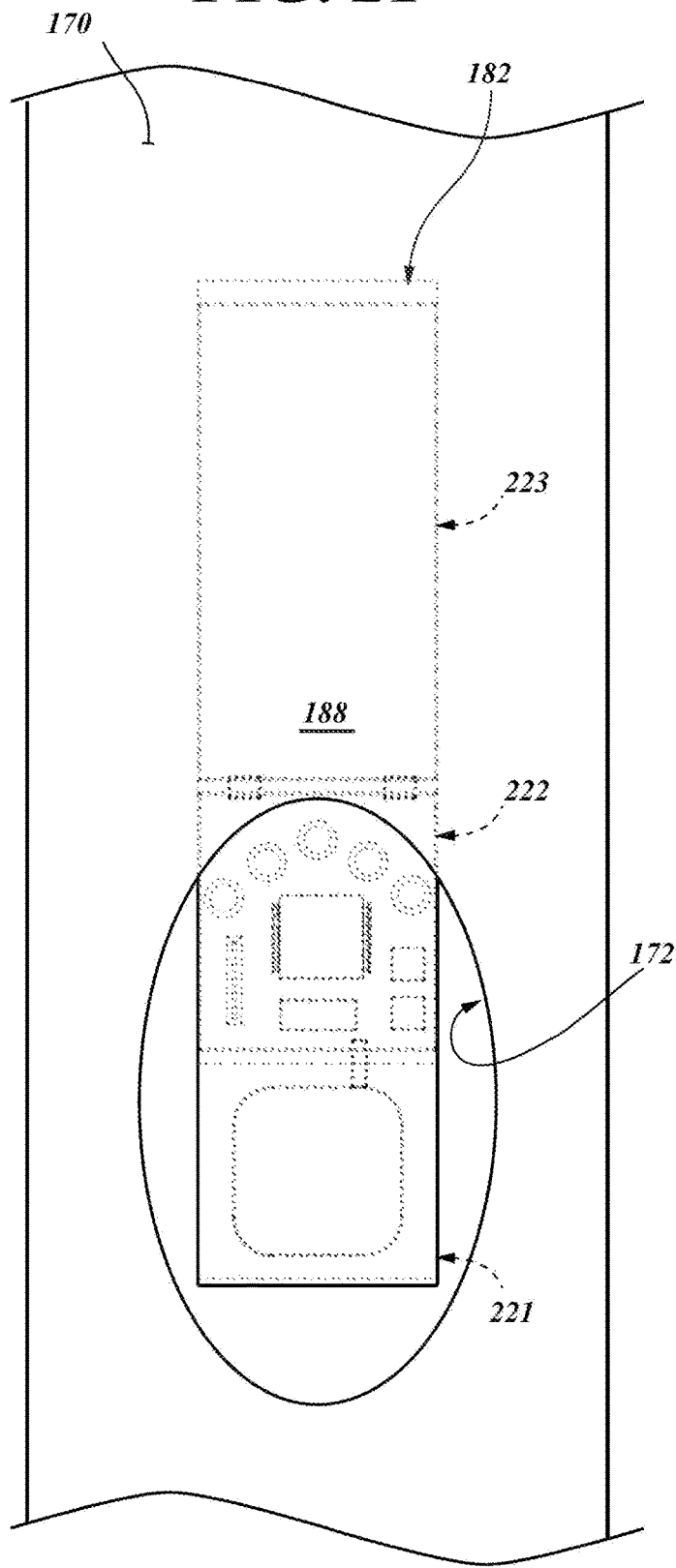
FIG. 21 is a "see through" view that shown the position of electronic components of the tracking device 176 inside the ski 170.

FIG. 21 is a "see through" view that shown the position of tracking device subassembly 188 with electronic components inside the ski 170. It can be seen that the electronic components 221,222 associated with radio communication and recharging of the battery are located within and under the radio window 172 of the ski assembly. In this view, the encapsulated radio tracking device 188 has been positioned inside the voidspace 182 in the ski and has been configured to rebalance the mechanical flexural and torsional characteristics of the substratum as would otherwise be imbalanced by removal of the voidspace mass 182.

Figure 22B:
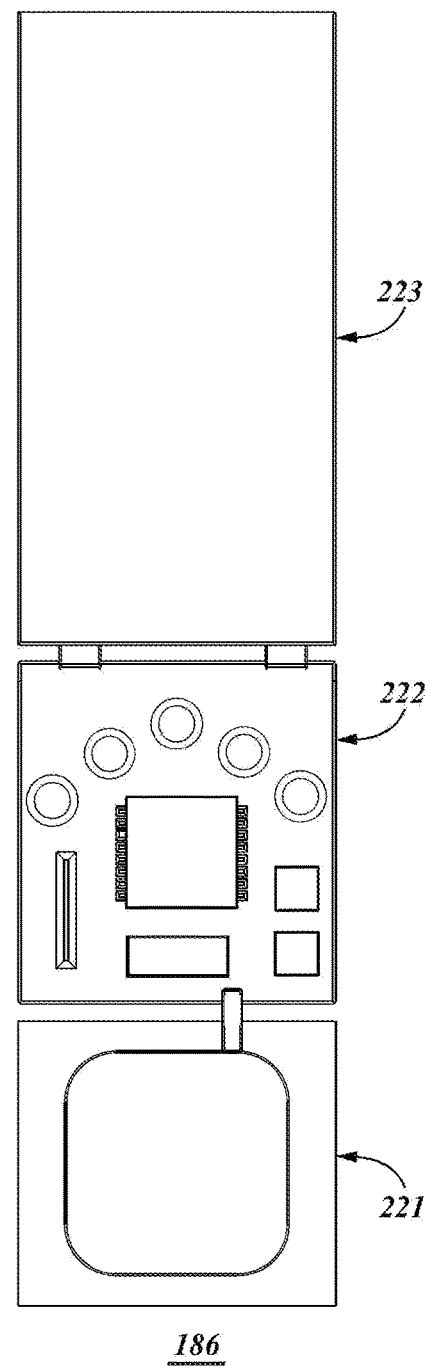
FIG. 22B is a plan view of the tripartite assembly 176 of FIG. 22A.
Figure 22A:
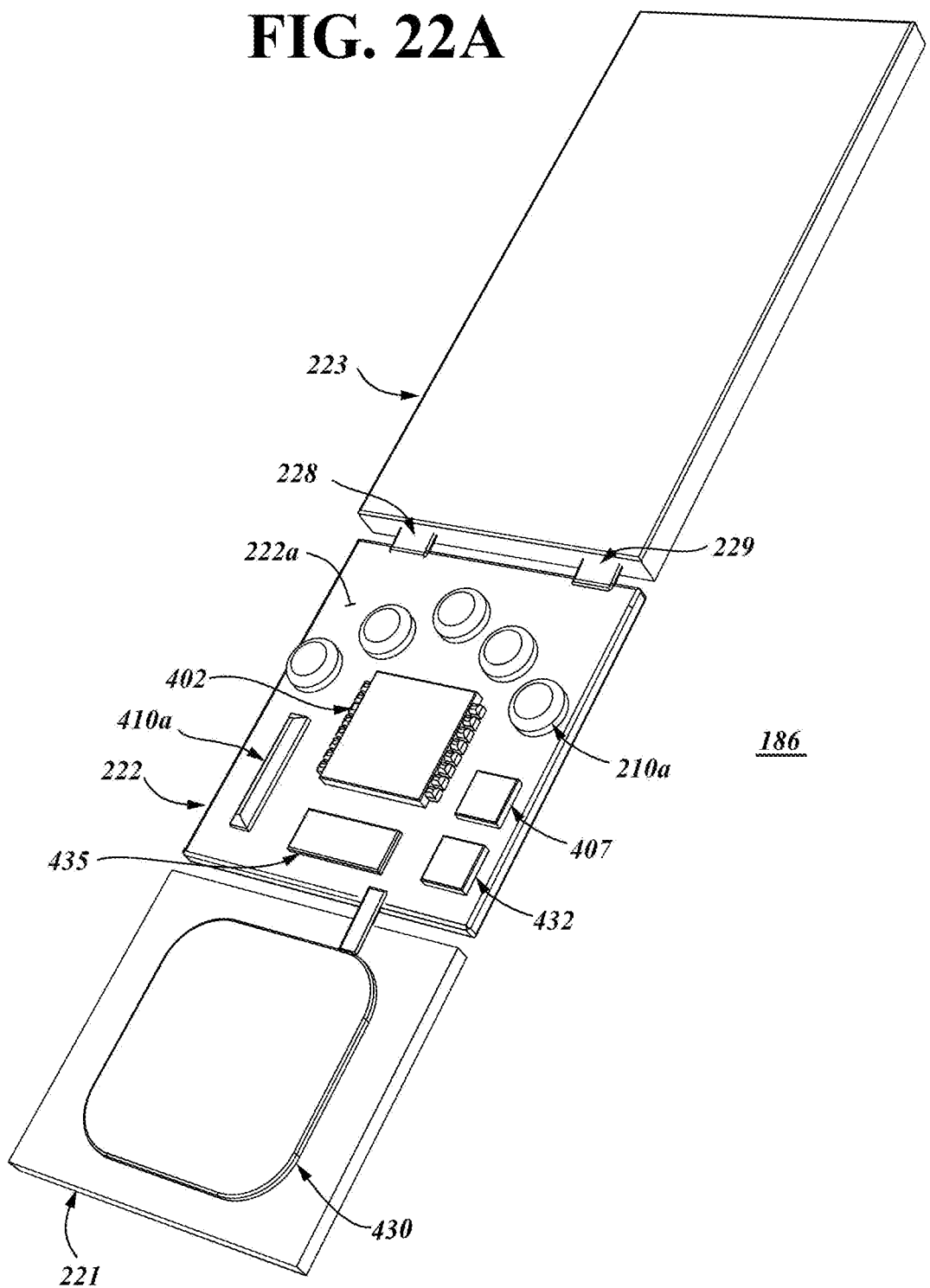
FIG. 22A is a perspective view of details of the components of the radio finder electronics package as a tripartite assembly 176.

FIG. 22A is a perspective view of details of the components of the tracking device electronics package as a tripartite assembly 186. Component 221 is a printed circuit board or equivalent platform that supports an inductive Qi charging coil 430 electrically coupled (FIG. 24) to a power management unit 432 on printed circuit board 222. The charging coil is configured to recharge battery 223,431 when exposed to an alternating electromagnetic field as known in the art.

PCB 222 includes an upper surface 222a metallized for tracing logic circuitry. An MCU 402 accesses processor-executable instructions for operating the associated tracking device logic circuitry 400 including a digital clock as known in the art. The MCU may be an ARM Cortex M4, for example, which includes BTLE 5.3 radio capacity. The processor may include a Bluetooth radio modem 410 that receives and broadcasts Bluetooth signals via ceramic antenna 410a or equivalent "print-on" antenna. The processor may also operate an NFC radio and antenna unit that is used to initiate pairing with smartphone or other smart device as part of a networking protocol by which a MAC address is assigned to the tracking device. Accelerometer or heading sensor 407 is also connected directly to the MCU. Other sensors may be supplied as part of a sensor package 460 or as integrated "system on a chip" circuits (SOC).

Figure 24:
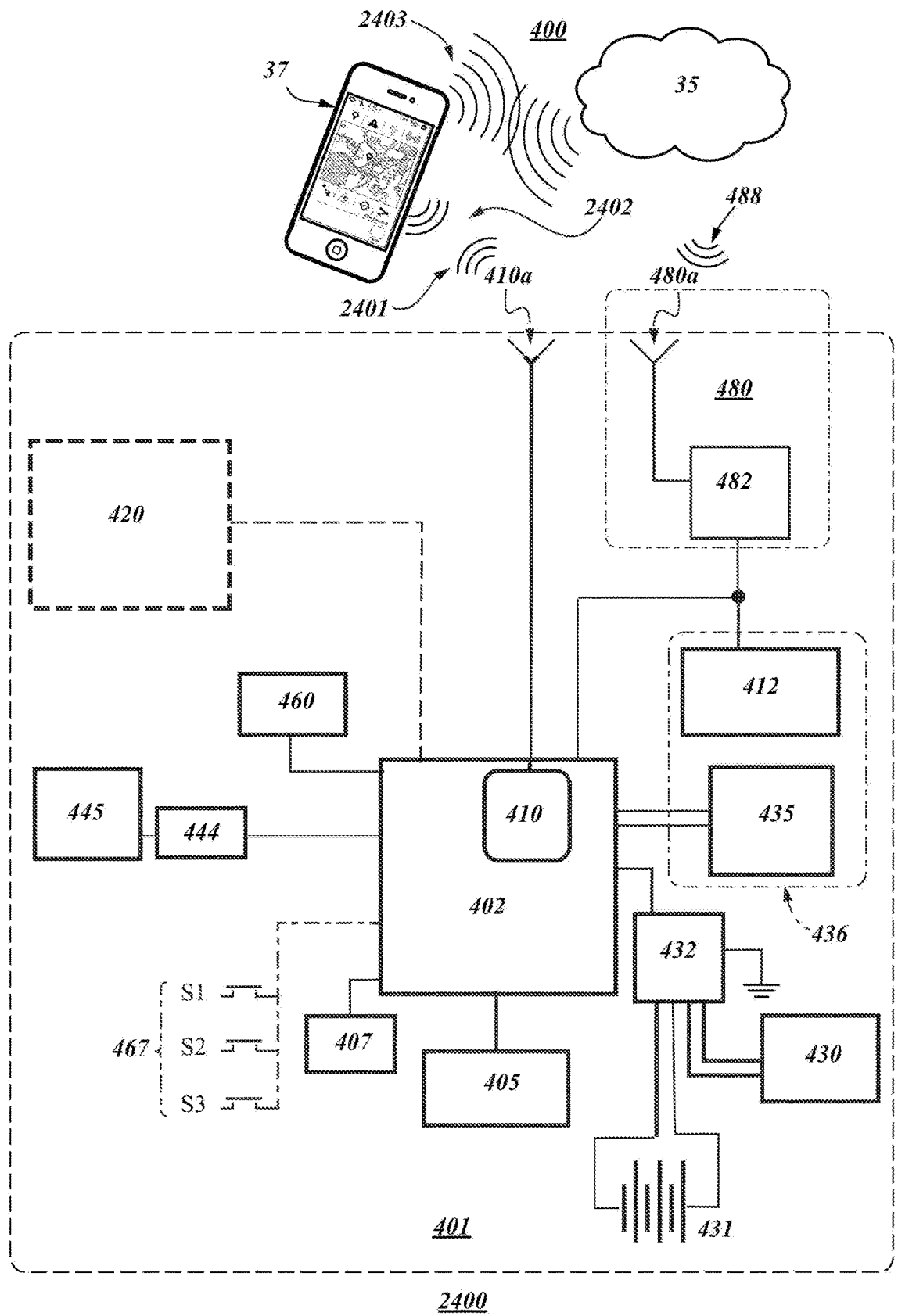
FIG. 24 is a block diagram of a radio finder device 401 with Bluetooth radio 410 and optional GPS radio package 480, and demonstrates a radio networking system 400 with a cloud host 35 (FIGS. 3,4) via smartphone 37 (FIG. 3).

The LED 210a is one of five LEDs that are used in a user interface. The lights may be strobed in various patterns to indicate the progress of "setup" of a paired link between the Bluetooth radio modem 410 and external smart device 37 (FIG. 24). The LEDs are also useful as a display to assist the user in identifying the location of the ski. A piezo speaker may be included to attract attention for provision of lost-and-found services. A device serial number and manufacturer's model number may also be shown on PCB 222.

Battery 223 is a lithium polymer battery with an anodic 228 and cathodic 229 connection to the PCB 222 with power management unit 432 and Qi charging circuit 430. The physical dimensions of the battery are in direct proportion to its Ah capacity, which may drive tracking device active life in the range of weeks to months, depending on use and programming. The three components of the tracking device electronics may flex independently on their connectors, reducing the possibility that a connection will fail due to flexion of the ski substrate.

FIG. 22B is a plan view of the tripartite assembly 186 of FIG. 22A. As described in FIG. 22A, the tripartite assembly 189 is readily visualized, with components 221,222 and 223 in electrical connection to power the tracking device electronics located on central section 222. In alternative embodiments, the power management unit 432 may be relocated to the Qi charger section 221, and the battery may be relocated to depend directly below the Qi charger section, for example. The details do not impact the fundamental principles of operation. A detailed schematic is not shown for clarity.

However, the principle of operation may be extended to other snow sport equipment such as snowboards, splitboards, snowshoes, and the like, given user interest in avoiding loss of these items. As an added part of the user experience (UX), the devices may be fitted with sensors that record and display performance metrics, including display of distances travelled, speed, accelerations, unwanted techniques that introduce vibration of slowing, and irregular motions or impacts. In some instances, the radio tracking devices may be useful in recovery after an avalanche, for example.

Example II

Figure 23:
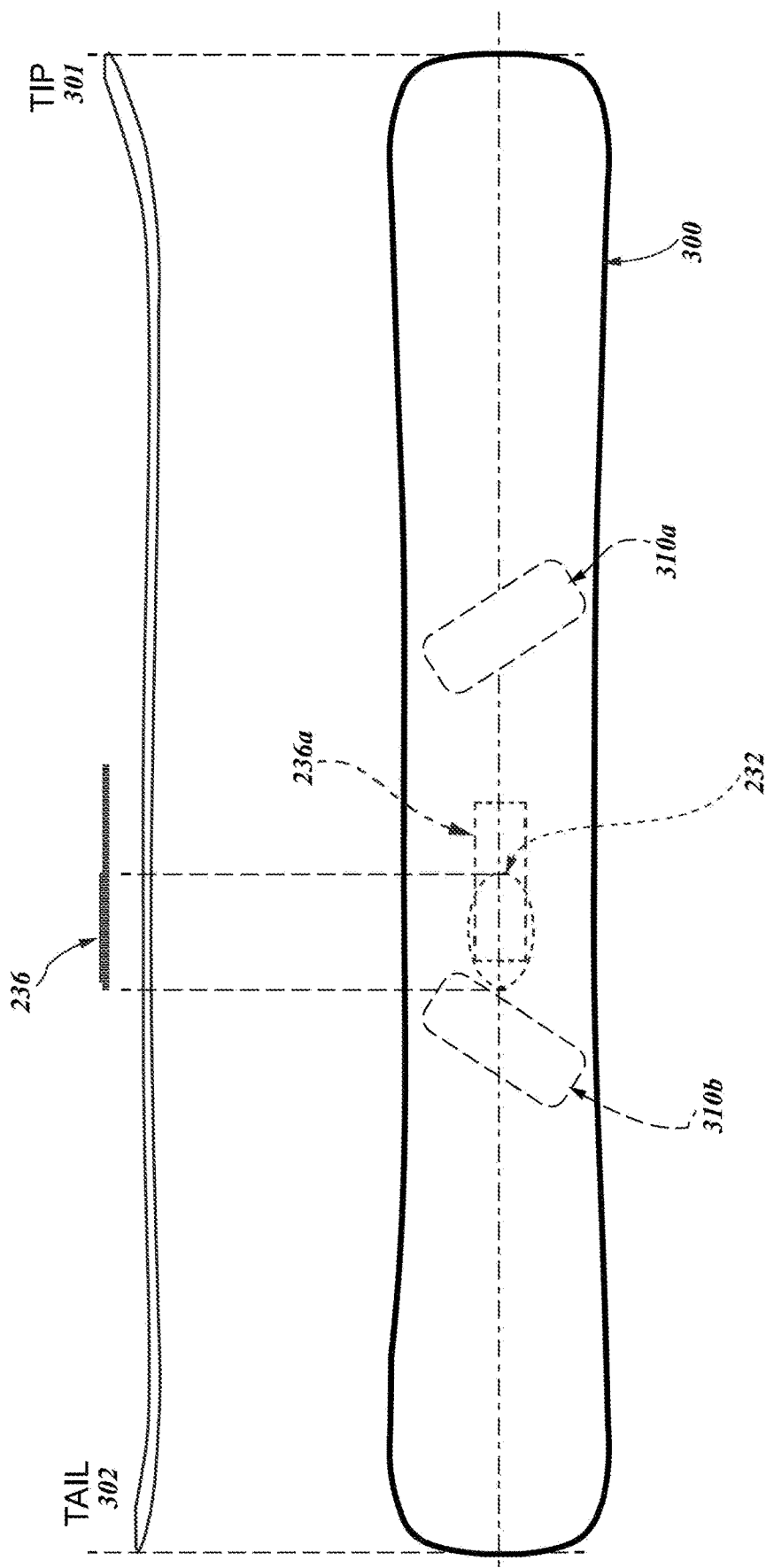
FIG. 23 is a composite plan and elevation view of a snowboard 300 with radio window 232 that includes a tracking device sub-assembly 236 (analogous to that shown for ski 170 in FIG. 22A). As integrated with the snowboard 300, the tracking device sub-assembly 236 is shown as dotted outline 236a. Alternatively, element 236a can be viewed as a space reserved for the tracking device in the snowboard.

FIG. 23 is a composite plan and elevation view of a snowboard 300 with tip 301 and tail 302, although in some instances snowboards are reversible in their travel. A radio window 232 includes an encapsulated, inserted or embedded tracking device sub-assembly 236 (analogous to that shown for ski 170 in FIG. 22A). As integrated with the snowboard 300, the tracking device sub-assembly 236 is shown as dotted outline 236a and corresponds to the TD3 device discussed in earlier screenshots.

Alternatively, element 236a can be viewed as a voidspace reserved for the tracking device 263 in the snowboard substratum and the device 236 may be viewed as a mechanical component of the snowboard that contributes to the flexion and mechanical characteristics of the board when analyzed as a mechanical stack of composite materials and defined dimensions. The insertion of the tracking device sub-assembly 236 into the snowboard body substratum is indicated with dashed lines drawn to the radio window 232. Advantageously, the tripartite segmented body aids in insertion by its capacity to bend slightly when lowered through the radio window (so as to permit removal if burn-in or quality control testing indicates a problem with the device).

However, not all boards include metal sheathing; many use fiberglass for rigidity, and hence the radio tracking device may be more flexibly positioned on snowboards or skis that lack metal trim. Also shown here are approximate positions for placement of boot bindings 310a,310b.

Example III

FIG. 24 is a block diagram 2400 with a system that includes a radio finder device 401 with Bluetooth® radio 410 and optional GPS radio package 480, and demonstrates a radio network 400 with a smartphone 37 (FIG. 3) and a cloud host 35 (FIGS. 3,4). Schematic 401 shows an embodiment of the radio tracking device or "radiotag". Processor 402 includes a BTLE radio modem 410 electronically coupled to an antenna 410a, including, if needed, an encoder/decoder in the radioset for parsing digital radio signals. The processor can be programmed, or otherwise configured, using software resident in non-volatile ROM (as 405) or as firmware, or a combination of both software and firmware. RAM 412 is provided for storage of volatile data, such as for "data logging" of sensor and location data that is transmissible by the BT radio or by an optional cellular radio modem 480. The data logger 412 is an optional component (as indicated by dashed line 436), but is useful for storing performance and sensor data when an associated smart device 37 is not receiving the data in real time. In next generation devices in which location is determined directly by the device, such as by GPS (optional radio component 480), the data logger can store waypoints for later retrieval by the companion smart device, such as smartphone 37, or by system 35.

The microcontroller unit (MCU) 402 defaults to low power mode (with just clock function) as a default, but can be powered up by a signal from the BT radioset or according to a power management schedule that also controls the cellular transceiver 480. The power management schedule may include power saving mode (PSM) mode for deep sleep and eDRX mode for intermittent wake at paging windows and for tracking area update (TAU) if provided with cellular capability. Relatively simple processors 402 with integral BTLE radio modems 410 can be used, such as the Dialog DA14683 (Dialog Semiconductor, Reading UK), Texas Instruments CC2652RB (Texas Instruments, Dallas TX), Toshiba TC35680FSG (Toshiba, Minato, JP), Nordic nRF52840 (Nordic Semiconductor, Trondheim, Norway) and related semiconductor packages.

While not shown, integrated "system-on-a-chip" packages (SOC) may include a microcontroller, a Bluetooth radio modem, and optionally a GPS receiver and location calculation circuit, for example.

Bluetooth® radio modem 412 is a spread spectrum, frequency hopping digital radio that operates in the ISM bands. A smartphone 37,38,72 (FIGS. 3,4,24) can receive Bluetooth radio traffic from any Bluetooth (BT) radiotag in radio proximity, and forward that traffic to an IP address associated with a Bluetooth group or community identifier, after adding a timestamp or a location stamp. By doing so, the smartphone (or other smart device) serves as a "hub" to transfer Bluetooth traffic radio contact records to a broader global network (or vice versa), enabling a range of location-driven services that can be modified according to sensor data. Smart devices include smartphones, for example, but may also include laptops, PDAs, Google glasses, smart wrist watches, and any generally portable device with Internet connectivity and onboard processing power is commonly understood to be a "smart device" sensu lato. Smart devices are typically provided with a SIM card when used in cellular telephonic radio communications. Each such device is given an IMSI identification number that points to one particular unique device and more generally is referred to as the cellular "radio unit identifier".

Many devices broadcast their RUI or MAC address in the open, or in response to a SCAN REQUEST. The RUI address can be an advertising address, a device address, a dedicated address of a piconet device, a virtual address, or a subscriber address, as is useful in mesh networks and for creating whitelists. Some address standards are open, others are proprietary or are obfuscated to prevent BT snooping.

In recent trends, BT signal payloads may include URLs that link the device to the physical web. Alternatively a community identifier is transmitted in a message as part of a header, routing address, or payload, and when recognized by packet decomposer in a receiving device, causes the message to be forwarded to an IP Address and associated cloud host. This approach has enabled community lost-and-found services such as described in US Pat. Appl. Publ. No. 2016/0294493, which is incorporated in full by reference.

The radio header and payload may also include resource identifiers that direct communications protocols in the link layer and activate software applications keyed to the resource identifiers. This approach is seen frequently with smartphones-installed applications can react in real time to BT transmissions. For example, a received BT transmission can wake up a sleeping device (US Pat. Appl. Publ. No. 2020/0242549), which is incorporated herein in full by reference. More recently, data supplied in the fields or payload of a BT transmission can cause an App to be installed, or if the App is installed and the appropriate permissions are in place, the App can be run at a particular instance in the program as most relevant to contextual clues in the received BT signal. This is termed "deep intent" to indicate that the App anticipates the user's thought process and causes the client smartphone to display the most relevant materials from a resource or takes an appropriate action in anticipation of the need. More recently the process has been extended to display screens, so that "walk up" computing is increasingly automated by invisible BT radio transmissions that identify the user and guess the user's intent from radio proximity or accelerometry data. For example, if a user picks up a shoe in a shoe store, a BT radiotag attached to the shoe will send a sensor output and a wall display screen will display more information about the shoe, or push that information onto the user's smartphone.

In connected links, BT signals transmit data. Newer BT 5.0, 5.1 and 5.2 standards permit multi-slot messages for sharing larger amounts of information, even encoding of speech. Connectionless data sharing is also supported in the newer protocols.

In a typical BT interaction, a first BT device in discoverable mode will cycle an INQUIRY packet one hundred and twenty-eight times in 1.28 seconds. Each inquiry packet is sent in 16 time slots (10 ms, 625 us each) over alternating frequencies per cycle. The INQUIRY packet is short, just an inquiry access code. A second BT device, operating in an unsynchronized listening mode, intercepts one of these transmissions by coincidence (there are 79 possible frequencies [or 40 depending on the standard], three of which are reserved as advertising frequencies in BTLE). The Baseband protocol causes each radio to use pseudorandom "frequency hops" to jump from frequency to frequency over the spread spectrum (U.S. Pat. No. 2,292,387). A device that is in INQUIRY SCAN at some crossover hop will intercept a packet with an inquiry access code that it recognizes, or that it chooses to accept. The frequency hop protocol is inherent in the access code, and a device that accepts an access code can then join the hop sequence with the first device and can send an FHS response packet containing its hardware address and its clock so that the first device can specifically address it with further instructions, if permitted. The interaction may then rapidly be escalated to a PAGE and PAGE SCAN interaction, resulting in a CONNECTION that formally makes a piconet link in which the RUIs of the radios are stored in device memory for future recall. The piconet relationship defines one of the devices as a "center" device ("master") and the other device as a "peripheral" ("slave") for purposes of organizing the transmission and receive sequences. At the hardware level, these roles are interchangeable and are controllable by a master-slave switch.

A BT device can participate in two or more piconets as separated by time division multiplexing with millisecond separation. While more limited in the newer BTLE standards, in one embodiment, any BT device may belong to a hierarchy of piconets, in which its participation in a second piconet is alternated with its active participation in a first piconet.

The device in the central role scans for BT radio transmissions, looking for advertisements and inquiry responses. The device in the peripheral role advertises itself and offers a service. GATT server vs. GATT client determines how two devices talk to each other once they've established a connection. GATT metadata is transferred from server sensor node to client center node, for example.

To inquire about other radio units in a receiving area, BT radios may also promiscuously announce their presence to other BT devices by sending a general INQUIRY access code (0x9E8B33, GIAC). An ID Packet may be exchanged in response to a FHS packet.

Access codes are classed as DAC, IAC and CAC, indicating Device Access Code, Inquiry Access Code, and Channel Access Code, respectively, the details of which relate to link management. All packets begin with the CAC, a DAC or IAC, and a clock number segment. A correlator identifies relevant packets for processing. BT devices acquire information about other local BT radios in this way.

In a piconet, using link management, devices that are parked or lose a pairing connection can ignore public traffic but will "wake up" (almost instantly) in response to a beacon signal from a familiar or "whitelisted" partner-so as to restore or recover a piconet connection.

The listening device can also partially wake up its MCU in order to log any radio contacts, while not responding further. Not all radio interchanges result in a CONNECTION, but the listening radio can record information about the transmission, and by escalating to INQUIRY SCAN without wasting time or energy, will receive more detailed information about the transmitting device.

Bluetooth Core Specification, Version 5.2 and Supplement (published in 2019, incorporated herein by reference) includes an "Extended Inquiry Response". Data types may be defined for such things as local name and supported services, information that otherwise would have to be obtained by establishing a CONNECTION. A device that receives a RUI and a list of supported services in an extended inquiry response does not have to connect to do a remote name request and service search, thereby shortening the time to useful information reception. Backchannel communications facilitate the connectionless mode.

Cellular radio modem 480 with cellular antenna 480a is configured to provide simplified cellular communication on a private network, often a virtual private network (VPN). In one embodiment, the radiotag device 400 is operated as a cellular device accessible by an IP address on the private network to find and track the whereabouts of the device via a dedicated and secure 5G private network VPN or gateway VPG that is administered by a cloud-host administrative server 35. A SIM module may be installed to establish the exclusive IP address in the radiotag device 400, with network access restricted to authorized parties such as smartphone 37. The cellular modem may be for example a Monarch LTE GM01Q (LTE-M/NB-IoT such as the SQN66430 SiP) or NB01Q (NB-IoT) LGA module with integrated SIM platform (Sequans, Paris FR), or an AcroFONE single-chip core from NPX (NPX Semiconductor, Eindhoven, Netherlands), for example.

In one embodiment, the cloud administrative host 35 implements the VPG or cloud host Internet Protocol (IP) network and uses the IP address to access the radiotag device. By using the VPG to wake up the radiotag device in a paging window as needed, sleep modes can be increased to save power. For example, an eDRX protocol can be overridden, or the parameters of a power saving mode modified. And by waking up the cellular modem, then more commands and data can be transmitted to the radiotag device and data can be uploaded from the radiotag device. Once the cellular radio is on, then network-assisted location fixes on its transmissions may be performed automatically.

Use of private IP addresses with a VPG reduces the incidence of inadvertent, unauthorized, and network-incidental messaging that can drain battery life. The cloud host 35 and associated cloud resources also adds a layer of artificial intelligence.

Devices having a cellular radio (vide infra FIG. 25, 580) may wake up periodically, get a location fix, report the location to the cloud host, and then return to sleep so that the battery life is months or years. In one embodiment, the VPG network may use the location information to create a "trail of waypoints" of locations of the radiotag devices (and any associated asset item) over time by periodically generating and logging locations obtained by AGPS in an energy efficient manner. RAM 412 may be used to store "waypoints", for example. A motion sensor or heading sensor also improves the efficiency of the devices. For any given time period, if accelerometric motion is detected that is characteristic of motion, or a vectored heading, a position fix is requested and fulfilled. For example, the position fix is not repeated unless motion is again detected. In a variant on geofencing, radiotag devices in identified "safe locations" are queried less frequently for location updates and not unless motion data is consistent with an excursion that would take the radiotag device outside a designated range of the safe location. The tempo of a walking person is one flag, the higher frequency vibration of an automobile ride is another flag that would trip a location update command inside the radiotag device. Thus only the accelerometer or heading sensor 407 needs to be monitored on battery power unless and until a location update command such as TAU is scheduled in advance or a query is received from the cloud host.

The signal strength of a cellular base station can also be monitored, as is typically the case in cellular networks to monitor connections and when needed transfer connections from one cell to another cell. Typically, the radiotag device location is updated by TAU when a handoff is made between two cell towers. Depending on rules set by the cloud host 35 that can be linked to the radiotag device user's profile, to local events, time of day, and so forth, the cloud host can also be notified if the radiotag device is reallocated from one cell to another. Because this can also occur when cell traffic is being levelled (i.e. by moving users from a crowded cell base station onto an adjacent base station having lighter traffic) the cloud host can monitor the base station carrier channels in the network path to differentiate location changes that are traffic load driven versus changes driven by a change in cell initiated because the radiotag device detected a stronger signal from an adjacent base station and elected to initiate a handover to the new system transmitter.

In some instances, the cellular radio chip 480 will also contain a GPS position locator. In other instances, a GPS chip 482 and antenna 480*a* may be supplied as a separate component(s), shown here as optional functional unit 480 (dashed border).

Because GPS involves an energy-intensive signal acquisition and calculation, triangulation methods for determining location may instead be implemented using the cellular or BT radiosets, and such methods are satisfactory where multiple base stations having known locations are available, such as in most urban environments. Use of hybrid cellular and BT location services are taught in the following co-owned U.S. Patents, all of which are incorporated in full by reference: U.S. Pat. Nos. 11,184,858, 11,450,196, 11,393, 323.

The radiotag device optionally includes user interface 420. The user interface may include display indicia such as LEDs, buttons, pressure-sensitive switches, a display screen, a piezoresistive buzzer, microphone, accelerometer, and so forth.

Inductive charger 430 (such as a "Qi Charger") may be used to recharge battery 431 via power management unit 432. NFC radio/antenna 435 may also be used for basic communications to bootstrap the BT or cellular radio devices, may contain an identifier useful in authenticating and pairing the device to other radio devices and in establishing network credentials, and may be used for product qualification and troubleshooting where needed. The NFC radio/antenna 435 is an optional component (as indicated by dashed line 436), but eliminates the need for bar code or QR code as an initial means for establishing a MAC address for the device during pairing and network association).

The radiotag device may include a vibrator driver 444 and one or more vibrators 445 configured to provide notification functions and may be combined with one or more buzzers. By selecting a higher dB (audio) piezoelectric buzzer 445, a FIND ME function can be realized analogous to the FIND PHONE function taught in U.S. Pat. No. 9,892,626, herein incorporated in full for all it teaches. Using the vibrator 445, a radiotag device may be "nudged." A nudge is useful when a user of a parent device wants to attract the attention of the user of the radiotag device, such as when a message is sent that needs a prompt reply. The "nudge" is essentially a tactile vibration that elicits the user's attention.

An accelerometer 407 may be wired to the MCU 401 (or may be integrated into the MCU). In one preferred device, a sensor is an integrated package having an accelerometer, gyroscope, and magnetometer for each axis. In some instances, the sensor package is incorporated into the processor 402. In some preferred embodiments, sensor 407 is a combined 9-axis motion sensor and temperature sensor. Generally, an XYZ three-axis accelerometer is included but may also include a 3D gyroscope and magnetic compass with firmware that generates a heading output to the processor. As illustrated above, the accelerometer or heading sensor 407 may be used to trigger processor functions as in motion/heading control and left-behind notifications. In some instances, input from the accelerometer, such as a double or triple tap, can be used as a wakeup signal as part of a power-savings sleep routine.

Charger antenna 430 or NFC antenna 2933 may be configured to receive tap signals that initiate a "pairing" sequence by which BT pairing between a radiotag and a user's smartphone is initiated. Each tap can be associated with a transmission of an RFID identifier from the radiotag to a device such as a smartphone equipped with an NFC reader and an executable instruction set for establishing tracking, finding and sensor monitoring, for example. On sensing a tap, the radiotag device powers on the NFC circuit to transmit the RFID ID and starts a bootstrap routine in cooperation with the smart device to configure a BT connection, pairing or bond, or a Wi-Fi connection for example, if a Wi-Fi radio package is included as an option. The NFC radio 435 is preferably configured to bootstrap staging and provisioning of a network connection to one of the higher bandwidth radios for devices having multiple radios; for example an NFC interrogatory can trigger setup and/or activation of a BT radio link, or a Wi-Fi link. The NFC radio may return a device identifier that is used to associate a radiotag device MAC address or radio user identifier (RUI) with a network host and user profile, Sensor package 460 may include one or more sensors that are not switch sensors and are thus distinct from switches 467 (S1, S2, S3), although switches are in a broader sense a form of sensors. Various combinations of sensors may be provided in a sensor package. For example, in addition to the accelerometer described separately, the sensor package can include a battery charge gauge, and/or strain sensors useful in evaluation of skier's performance and more energy hungry sensors such as optional GPS receiver 480. A GPS antenna 480*a* and chip 482 is shown, may be part of a smart GPS package 480, that is, activation occurs when there is a need, such as when there is motion of the wireless device or there is a situation in proximity to the wireless device (as detected from other data feeds) that necessitates, or can benefit from, closer tracking and monitoring of location. AGPS may be used to reduce power. Tracking services benefit significantly from GPS, but basic rangefinding, proximity locating, and triangulation can be achieved using other radio capabilities such as ultrawideband radio (UWB) if incorporated into the radiotag circuit 400.

The radiotag 401 can also provide location information relative to other BT radiotags of a group that are in BT radio proximity. The radiotag need not be an attachable device, but in some instances may be "embedded", "integrated" or "encapsulated" directly in a "smart object". In other embodiments, the radiotag may receive power from the smart object. Each radiotag 401 operates in a network environment enabled by smartphone 37 (or equivalent smart device) and cloud host 35. The capacities of the network are significantly greater than the individual capacity of the radiotag in most instances, but in some instances, a merited level of "edge computing" is built into the radiotag. These and other improvements described here demonstrate their worth in the world of the internet-of-things (IoT).

In this embodiment (FIG. 24), the snow sports equipment tracking system 2400 comprises an optional GPS sensor 480 (dashed border) with antenna 480a for receiving GPS satellite signals 488. The GPS sensor circuit 482 is configured to make an onboard location determination and the processor 402 is configured to report the location to a smartphone 37 via a Bluetooth® radio modem 410. The tracking device 401 relies on a hybrid radio network 400 to communicate with the system host, represented here as a cloud host server 35 or with a local smart device, represented here as a smartphone 37. Initially, the smartphone 37 establishes a Bluetooth radio contact 2401 with the tracking device 401, receives the location information 2402, and forwards the data 2403 (including any sensor package data) to the cloud host server 35. Because the information includes a radio unit identifier (RUI) of the tracking device TD3, the cloud host is programmed to look up a user profile associated with the item or asset owner and to make an administrative decision about what command(s) to execute. In a simple instance, the cloud server simply stores the location as a waypoint specific to the particular tracking device (TD3 in the previous example, Example II) so as to track the device. In more complex instances, the cloud host may issue a notification to the owner. The owner of the item or asset is not necessarily the owner of smart device 37; a community of users that numbers in the Billions worldwide at this writing, can knowingly or unknowingly assist in locating and tracking a missing item or asset such as a valuable pair of skis or a snowboard. Use of cloud-based "shared" locator and tracking services (termed "cloudcutting") are described in co-owned U.S. Pat. Nos. 9,774,410, 9,900,119, 10,063,331, 10,361,800, 10,937,289, 11,403,924, and patents pending. However, it should be recognized that if the BT contact is made with the owner's smartphone 37,38,72 (FIGS. 3,4,24), then the owner may use the "Bluetooth Proximity Locator Toolbox" to guide the search to the missing device, as described in co-owned U.S. Pat. Nos. US11,184,8558, U.S. Pat. Nos. 11,450,196, 11,393,323, and patents pending. All said patent documents are incorporated in full for all that they teach.

Example IV

Figure 25:
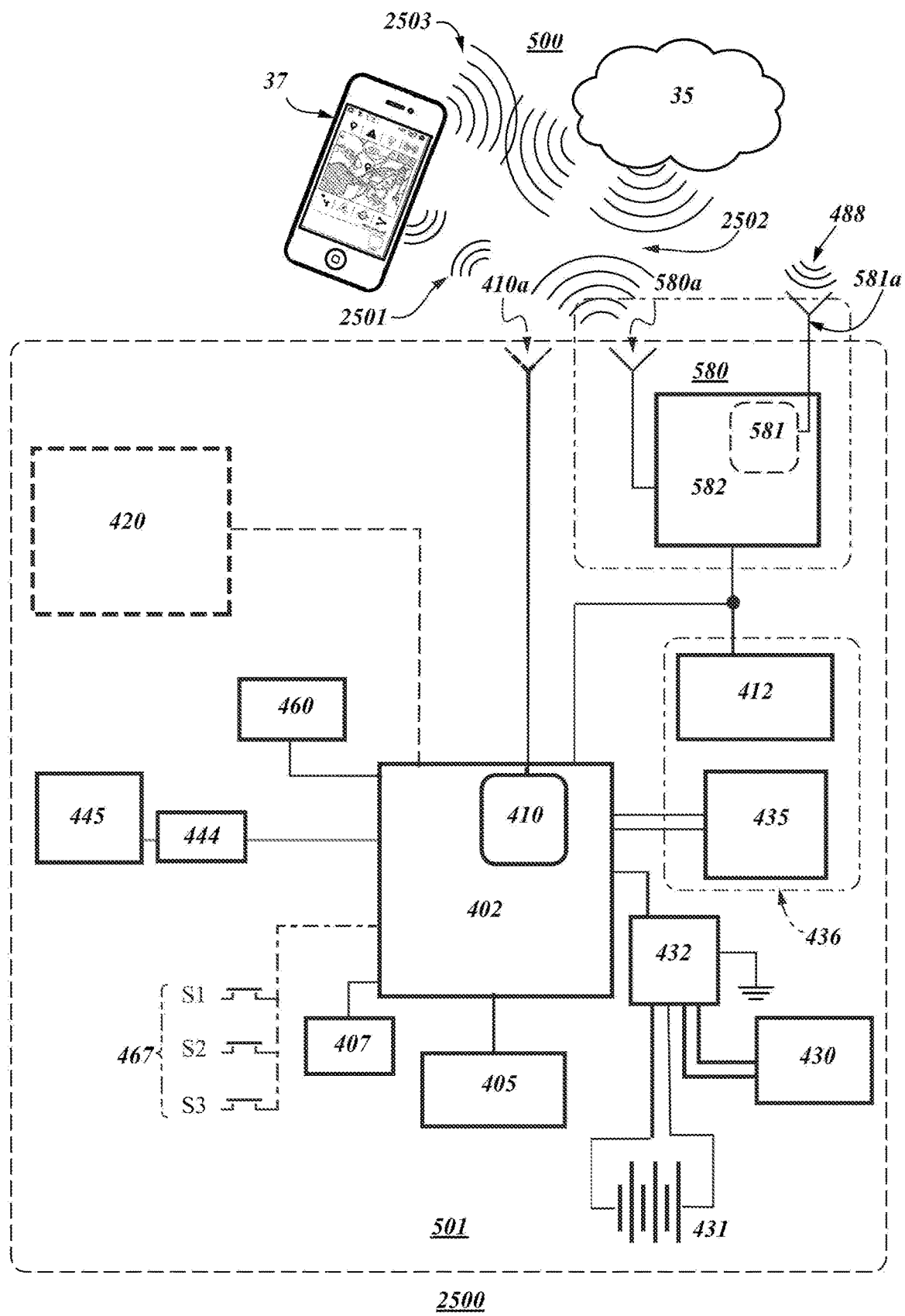
FIG. 25 is a block diagram of a radio finder device 501 with Bluetooth radio modem 410 and optional cellular radio package 580 with optional GPS radio package 581 as an SOC, and demonstrates a radio networking system 500 with a cloud host 35 (FIGS. 3,4) networking directly by cellular radio modem package 580 or networking via BT-enabled smartphone 37 (FIG. 3).

FIG. 25 is a view of another related system 2500 for providing location and tracking services. In this embodiment, the snow sports equipment tracking system comprises a tracking device 501 with an optional cellular modem 580 and antenna 580a package (dashed border), optionally including a GPS sensor 581 with antenna 581a for receiving location satellite signals 488. This hybrid radio device 501 is capable of "edge computing" to determine its own location, and may report its location to a cloud host 35 directly via a cellular channel, or indirectly by a BT channel when it comes in contact with a BT-enabled smart device 37 such as a smartphone (either the smartphone of the object or asset's owner, or a smartphone of a community of users). Both radio pathways enhance the end user's experience (UX) with the product(s) because (A) BT radio is a low energy system that allows for extended unit life in the field (months) and is promiscuous in connecting with other BT radios that enter its radio proximity, and (B) cellular radio permits direct contact and location reporting outside the field of BT radio proximity. Using cellular radio, the device can reach out to the owner's smartphone directly, or can share its location with a cloud host server 35 so that administrative command decisions can be made on the owner's behalf. Users that belong to the "community of users" need not be aware that the data is being anonymously forwarded to the cloud host 35.

While not shown in FIG. 25, an integrated "system-on-a-chip" packages (SOC) may include a microcontroller, a Bluetooth radio modem, optionally a cellular radio modem, and a GPS receiver and location calculation circuit in a single package, for example. The Bluetooth radio modem includes power controller hardware and firmware capable of engineering multiple power states from "deep sleep" with clock function only all the way to "full activation" including cellular modem and the GPS function, which are higher energy states. Battery life is engineered based on expected user needs, but by virtue of the parsimony of BTLE modem function, a ski season can be powered on a single battery charge.

What makes this exciting is a first real world implementation of a global IoT. The radio tracking devices of the invention are already implemented to report location and sensor data from Billions of user smartphones and other smart devices such as tablet computers. In the immediate future, most of the human population, anyone with a smartphone, may be the eyes and ears of a global tracking system for lost objects, assuming each user agrees to share data anonymously by approving appropriate privacy permissions. In a preferred system embodiment 2500, the cloud host server 35 has the capacity to monitor lost items via smart devices having either of the major operating systems currently in use.

Two networks are hybridized in radio network 500. Tracking device 501 may contact and communicate promiscuously with any BT radio transceiver (including smartphone 37) the comes into local radio proximity of BT radio range. And, simultaneously or separately, tracking device 501 may contact and communicate via cellular radio over miles and miles, with or without BT assistance, in communicating 2502 with the cloud host server 35 or with any smartphone or other cellular-enabled smart device in range of the nearest cellular tower or tower network. The cellular radio link may be direct 2502 or indirect 2503 if a smartphone 37 is forwarding the call from a tracking device 501. The cellular link may be bidirectional, so that data, including firmware updates, or status commands, may be delivered to the tracking device 501 bidirectionally, depending on pre-programmed owner preferences or on administrative practice and authorities.

As never before realized, these networkable tracking devices use a distributed network of Billions of compatible smart devices 37 to help locate items and assets anywhere on the globe. In this context, we focus here on skis, snowboards and splitboards.

In addition to location data, in some embodiments sensor data may also be transmitted, either to the owner's smartphone in one instance, or again to the cloud host 35 in another instance. Sensor package 460 may include one or more sensors that are not switch sensors and are thus distinct from switches 467 (S1, S2, S3), although switches are in a broader sense a form of sensors. Various combinations of sensors may be provided in a sensor package. For example, in addition to the accelerometer described separately, the sensor package can include a battery charge gauge, and/or strain sensors useful in evaluation of skier's performance and more energy hungry sensors such as optional GPS receiver 580. The GPS antenna 581a may be separate from the cellular antenna 580a as shown, but, in some instances, a combination antenna package is used. GPS may be actuated at extended intervals to save power, and may be smart GPS, that is, activation occurs when there is a need, such as when there is motion of the wireless device or there is a situation in proximity to the wireless device (as detected from other data feeds) that necessitates, or can benefit from, closer tracking and monitoring of location. AGPS may be used to reduce power. Tracking services benefit significantly from GPS, but basic rangefinding, proximity locating, and triangulation can be achieved using other radio capabilities such as ultrawideband radio (UWB) if incorporated into the radiotag circuit 501. In any event, GPS signal 488 will be received and processed so that a self-determined location can be stored in local memory or sent via either the BT pathway 2501/2503 or the direct cellular pathway 2502. Thus the owner can control, by setting parameters and permissions in a user profile registered with the cloud host 35, who will be able to track the location of the item and can share that tracking capability with friends, for example, as described earlier (FIG. 8, 140,142). And if the item is truly lost, and not merely misplaced such that the Bluetooth Proximity Locator Toolbox is ineffective in locating the asset or item, then the cellular capability is invaluable in extending the search to the city, county, nation or planet. That is the deliverable that the IoT has promised and is realized here. Using BT alone (radiotag 401, FIG. 24), a global network of community users (more than a Billion) can report an approximate location of a missing device. Using a combination of BT and cellular (radiotag 501, FIG. 25), the owner has the capacity to tap into the resources of the cloud to both locate and track the device in real time, and can even receive predictions about where the device will be in 20 minutes or an hour if the device is moving.

When using the cellular radio modem 582 option as a tracking and finding service, several levels of tracking services may be provided, each with a different expected battery life on a single charge. Power burn rate is estimated based on balanced radio usage and latency for the cellular and/or BT radio modems. A "Dynamic Tracking" mode, which updates location at a central server every 30 to 90 minutes, is recommended for most routine use, but in the event of a lost smart object, the devices can be upgraded to uplink data every 4-8 min in an "Emergency Tracking" mode. Lower power tracking provides updates every 4-6 hours, and for maximum battery life (up to 1 year), a BT-only tracking regimen is supplied (as would be achieved with embodiments modelled on radiotag 401, FIG. 24).

With reference to FIG. 25, assuming a radiotag tracking device 501 with cellular radio modem package 580, each of the cellular subscription plans is associated with radio parameters for EDRX and PSM, and can be modified anytime the radiotag 501 opens a cellular network connection in a paging window, or is in BT communication 2501 with a community smart device 37,38,72 having a network connection 2502,2503 to cloud host 35. As described in US. Pat. Publ. No. 2021/0152976, titled Hybrid Cellular Bluetooth Tracking Devices, Methods And Systems, the BT radio and/or the sensor package, including accelerometer and heading sensors 407, can trigger a CALL HOME during which the power savings parameters can be reset. Also, biometric data can be linked to a CALL HOME. An actuator button such as S1 (467) can also cause a cellular connection to be initiated, or a tap by an NFC-enabled smartphone will actuate a network connection. A virtual geofence, established by logging location coordinates around a radiotagged asset or item, enables a WAYWARD OBJECT alert to be generated if the device 501 moves beyond the outer perimeter of the geofence, and the alert is sent to the owner. In a preferred embodiment, the virtual "radio leash" moves with the owner's control apparatus 37, and establishes a radio proximity leash that if broken, results in either of a LEFT BEHIND or a WAYWARD OBJECT alert to the owner and optionally an audible warning emitted by the radiotag 501 itself using piezo speaker 445 and driver 444. Other features include a history of locations stored in flash memory 412 and an activity tracking log by which performance data can be collected in real time and reviewed later.

As demonstrated in Examples I, II, III and IV, the invention provides for a snow sports equipment tracking system 2400, which includes an item of sports equipment possessing a substratum 171 and a radiotag device 186 disposed within the substratum; wherein the radiotag device is configured to broadcast a first BT location signal 2401, the location signal is receivable by an associated smart device 37 having an instruction set, which when executed by a processor of the smart device, enables the location of the item of sports equipment to be determined and displayed on the smart device so that the item or asset may be recovered; and, further wherein the radiotag device is a structural member of the substratum, such as a ski, snowboard or splitboard, for example. The structural member that is the radiotag may impart a novel flexural or torsional characteristic to the snow sports equipment as measured by an onboard strain sensor, or as perceived by the rider. In some related embodiments, the radiotag device is embedded within the substratum and the embedding compound is a radiolucent polymer having an elastic modulus that is compatible with the flexural requirements of the substratum. In other related embodiments, the radiotag device body is a structural member of the item, and imparts to the item flexural, torsional or tensional characteristics that improve the performance of the snow sports equipment.

In some embodiments, the radiotag device is inserted through a radio window in the substratum as a segmented body or stack of electrical components encapsulated in or overlaid with a rubbery gasket. In a first embodiment, the segmented body may include three body segments that define an inductive coil segment, a microcontroller with radio modem(s) segment, and a battery segment. The battery segment may be a flexible battery body or a rigid battery body, and the dimensional volume of the battery body generally correlates with the expected field life of the radiotag between charges. In a preferred embodiment, the battery size is configured so that the typical user will expect to recharge the unit once at the beginning of ski season, and once at the end of ski season each year.

In other embodiments, the snow sports equipment tracking system is configured to join a radio network with a cloud host such that a companion smart device 37 is an intermediary communications device between the tracking device 400 and a cloud host 35.

In more detail, as relates to Example I, the snow sports equipment tracking system is formed as a substratum, and the substratum comprises a radio window in a radioopaque substrate overlayer disposed on a superior surface of the substratum.

Examples of snow sports equipment items having a substratum include skis, snowboards, splitboards and snowshoes. Example II illustrates a snowboard with radio tracking device. Example III illustrates the system that combines the radio tracking devices with network resources and software.

The radiotag device (186,188,236,400) is encapsulated, embedded, potted, or inserted into the substratum of the snow sports equipment item and will generally include a rechargeable battery and an inductive coil configured to recharge the battery when coupled to an associated oscillating electric field.

The radiotag device, also termed a "tracking device" (186,188,236,400), may include a radio user interface, or more generally a user interface, and the user interface may include one or more switches and displays that the user may interactively control and evaluate.

Some embodiments may include cellular radio capacity. The hybrid cellular radiotag device is configured to broadcast a second cellular location signal 2402, the location signal is receivable by an associated system network 2400, and the derived location is displayable on any smart device having system network access. Wi-Fi and UWB radio capacity may also be incorporated in other embodiments.

The radiotag device will generally include a sensor package 460 and a data logger 412, and wherein the data from the data logger is transmissible to a smart device 37 or a system network cloud host 35 configured to analyze and display performance metrics or waypoints on a remote device. Location by GPS may also define a sensor feature, and GPS may be integrated as part of the sensor package or as part of a cellular radio modem package by an SOC approach. In an embodiment, the GPS sensor 460 is configured to make an onboard location determination and to report the location to a smartphone 37 or cloud host 35.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

Scope of the Claims

The disclosure set forth herein of certain exemplary embodiments, including all text, drawings, annotations, and graphs, is sufficient to enable one of ordinary skill in the art to practice the teachings. Various alternatives, modifications and equivalents are possible, as will readily occur to those skilled in the art. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the disclosure.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

I claim:

1. A snow sports radiotag combination comprising:
   a substratum or substrata having a long and narrow curvilinear axis with a tip rocker, a middle camber, and a tail rocker, the substratum or substrata in cross-section comprising a radioopaque alloy overlayer separated from a radioopaque alloy underlayer by a radiolucent core layer, wherein the radioopaque alloy overlayer is configured to actively control a cutting edge of the substratum by the mechanical properties of an ellipsoidic cutout in the camber, the ellipsoidic cutout cutting through the radioopaque alloy overlayer and at least a part of the radiolucent core layer;
   a radiotag assembly encapsulated between the overlayer and the underlayer of the substratum or substrata; the radiotag assembly comprising a BTLE radio, an antenna, a radio, and a battery, wherein the antenna is aligned with the ellipsoidic cutout such that the ellipsoidic cutout defines a radio window; whereby the radio window enables the BTLE radio to broadcast an ISM 2.5 GHz low energy digital bluetoothed radio signal from the core layer of the substratum, the radio signal configured to be received by a radio-proximate smartphone having an instruction set, which when executed by a processor of the smartphone, enables the location of the radiotag assembly to be determined, optionally to be displayed on the smartphone, optionally to be transmitted over a WAN network, and optionally to be received by a cloud lost-and-found service; and,
   a sealant layer sealingly encapsulating the radioopaque alloy overlayer, the ellipsoidic cutout, any cut in the at least a part of the radiolucent core layer, and the radiotag assembly between the radioopaque alloy overlayer and the radioopaque alloy underlayer, the sealant layer functioning as a wearproof layer for receiving boots and boot bindings.

2. The snow sports radiotag combination of claim 1, wherein the radiotag assembly is a structural member having flexural characteristics that improve the performance of the substratum or substrata.

3. The snow sports radiotag combination of claim 1, wherein the battery of the radio assembly is inductively chargeable while encapsulated in the substratum or substrata.

4. The snow sports radiotag combination of claim 1, wherein the radiotag assembly further comprises a plurality of LEDs.

5. The snow sports radiotag combination of claim 4, wherein the plurality of LEDs are arranged in an arc across a width of the substratum or substrata.

6. The snow sports radiotag combination of claim 1, wherein the radiotag assembly includes a tripartite body that includes a first component, a second component, and a third component;
   wherein the first component includes the battery;
   wherein the second component includes the BTLE radio, the antenna, and the radio; and
   wherein the third component includes an inductive charging coil.

7. The snow sports radiotag combination of claim 6, further comprising a gasket layer arranged between the tripartite body and the radioopaque alloy overlayer.

8. The snow sports radiotag combination of claim 6, wherein the first component, the second component, and third component are flexibly connected to allow the components to flex independently.

9. The snow sports radiotag combination of claim 1, wherein the snow sports radiotag combination forms a ski, a snowboard, or a splitboard.

\* \* \* \* \*